INVENTORS
HERMAN A. AFFEL, JR.
DANIEL E. EISENBERG
WILLIAM F. SCHMITT
FRANKLIN W. KERFOOT, JR.
ARTHUR D. HUGHES

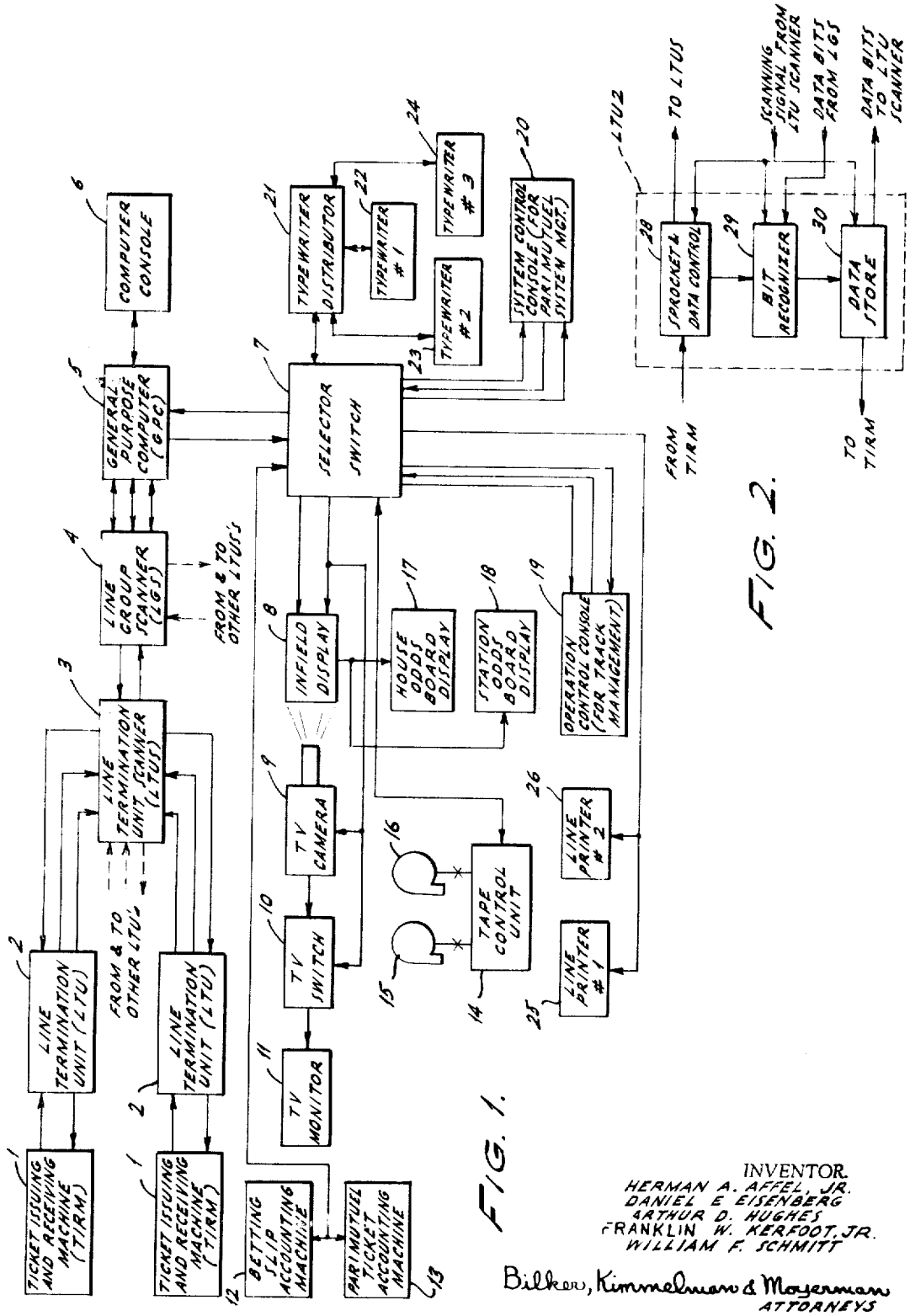

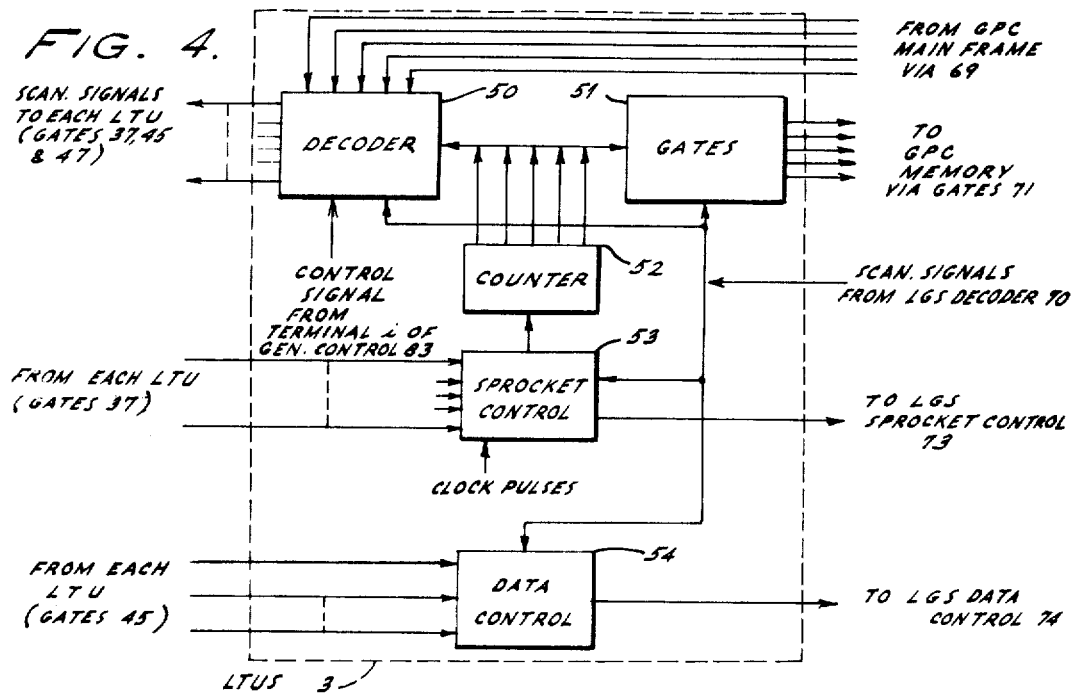
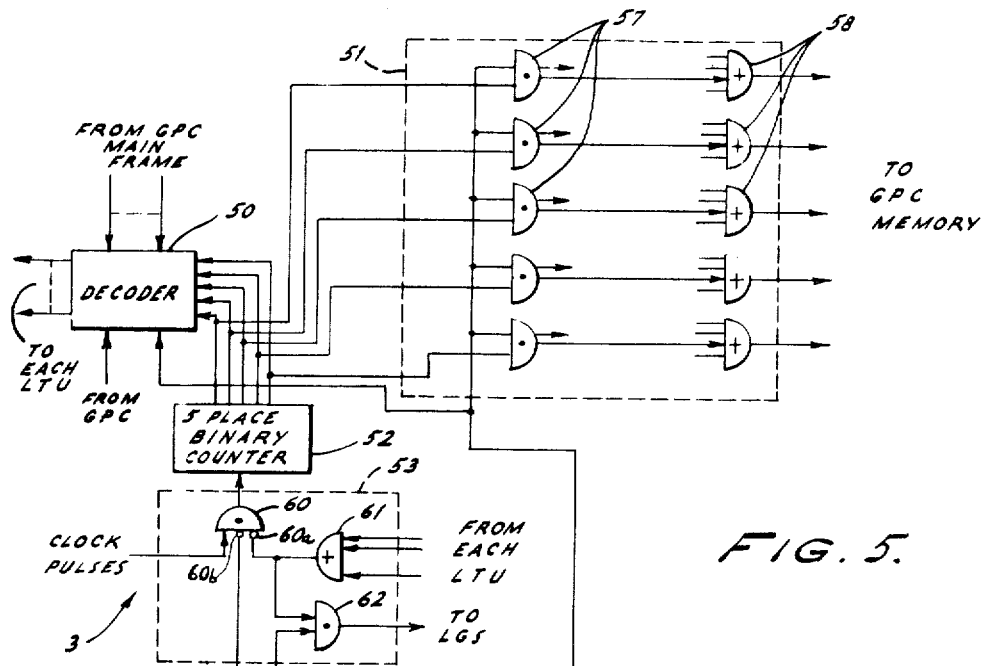

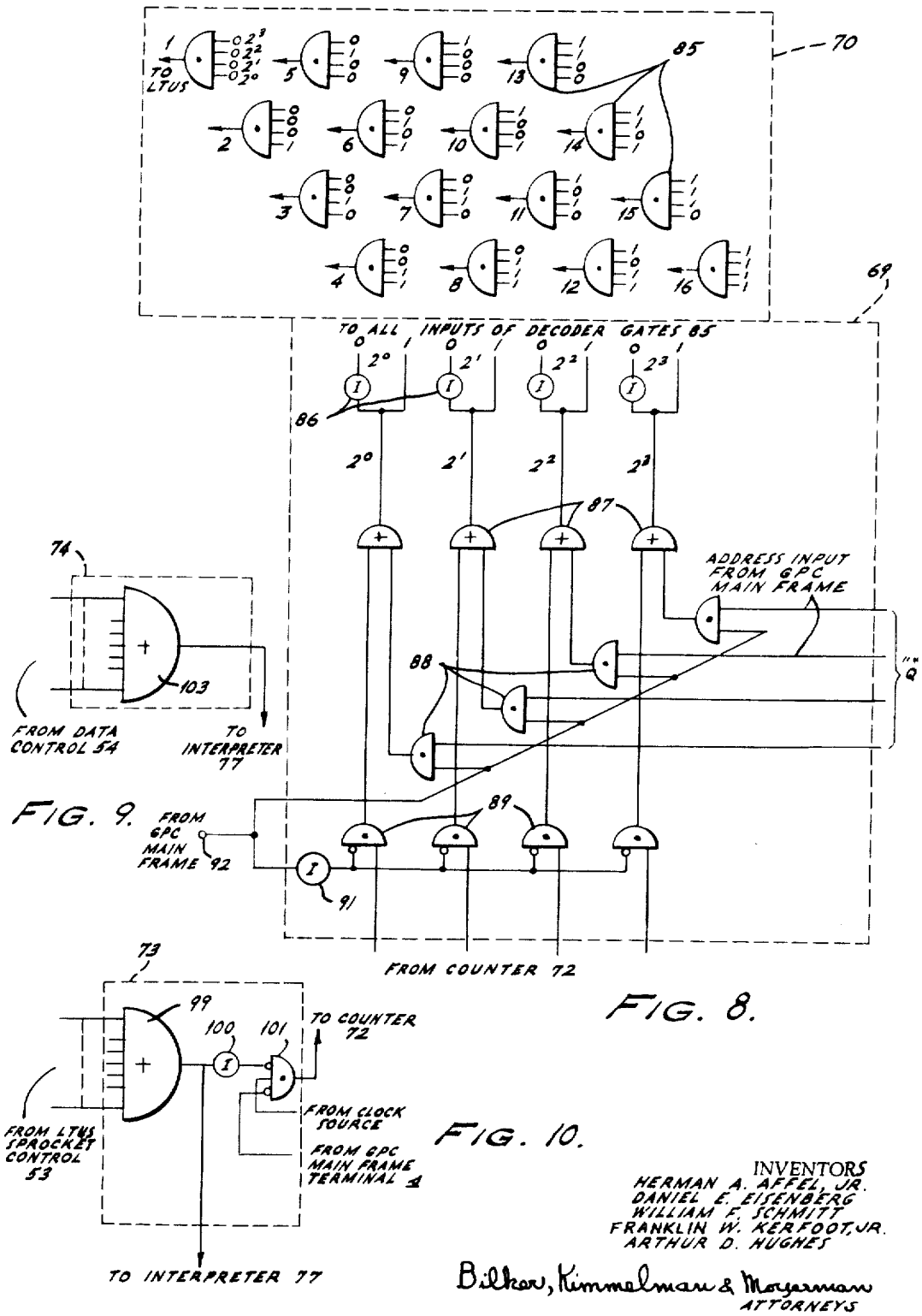

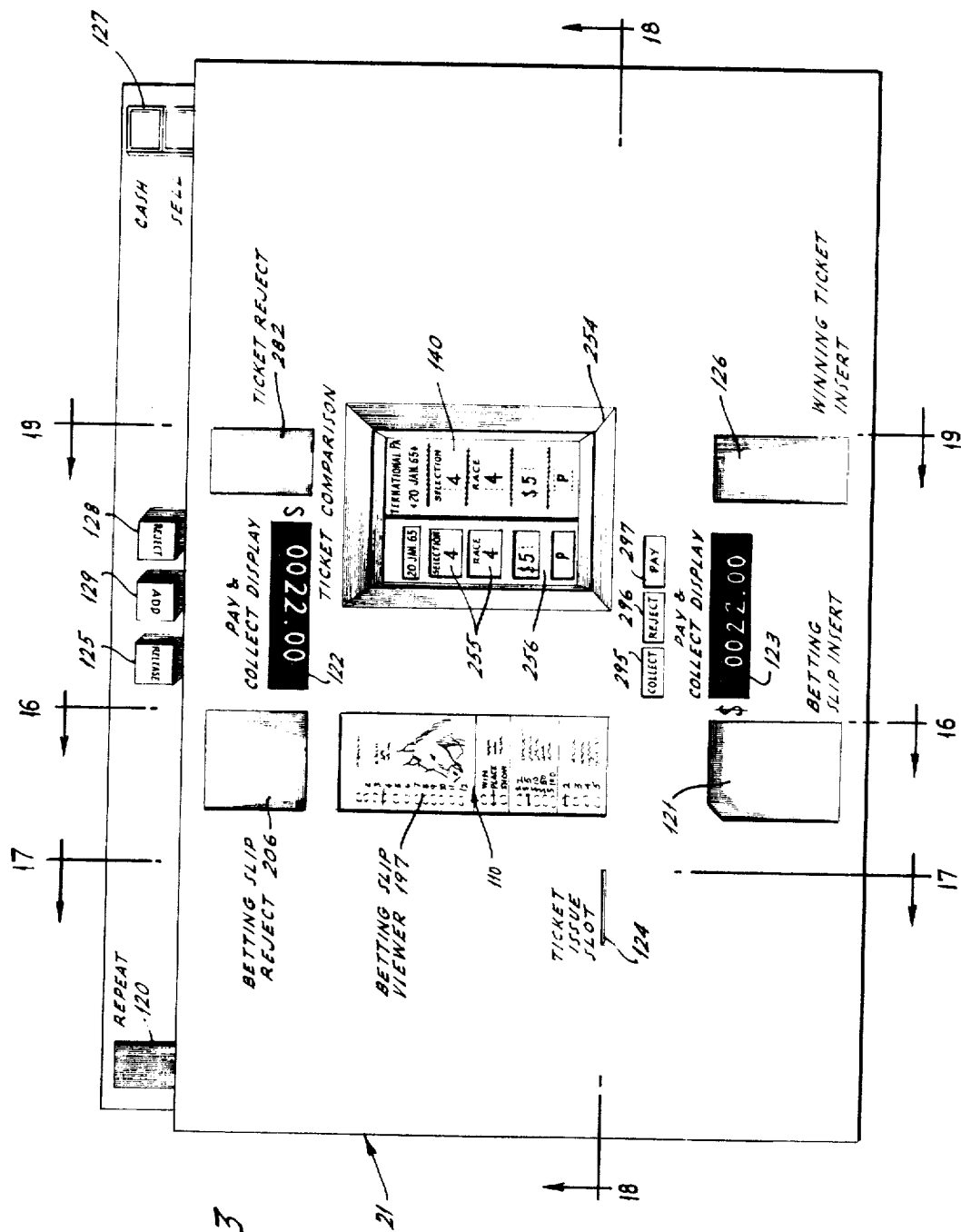

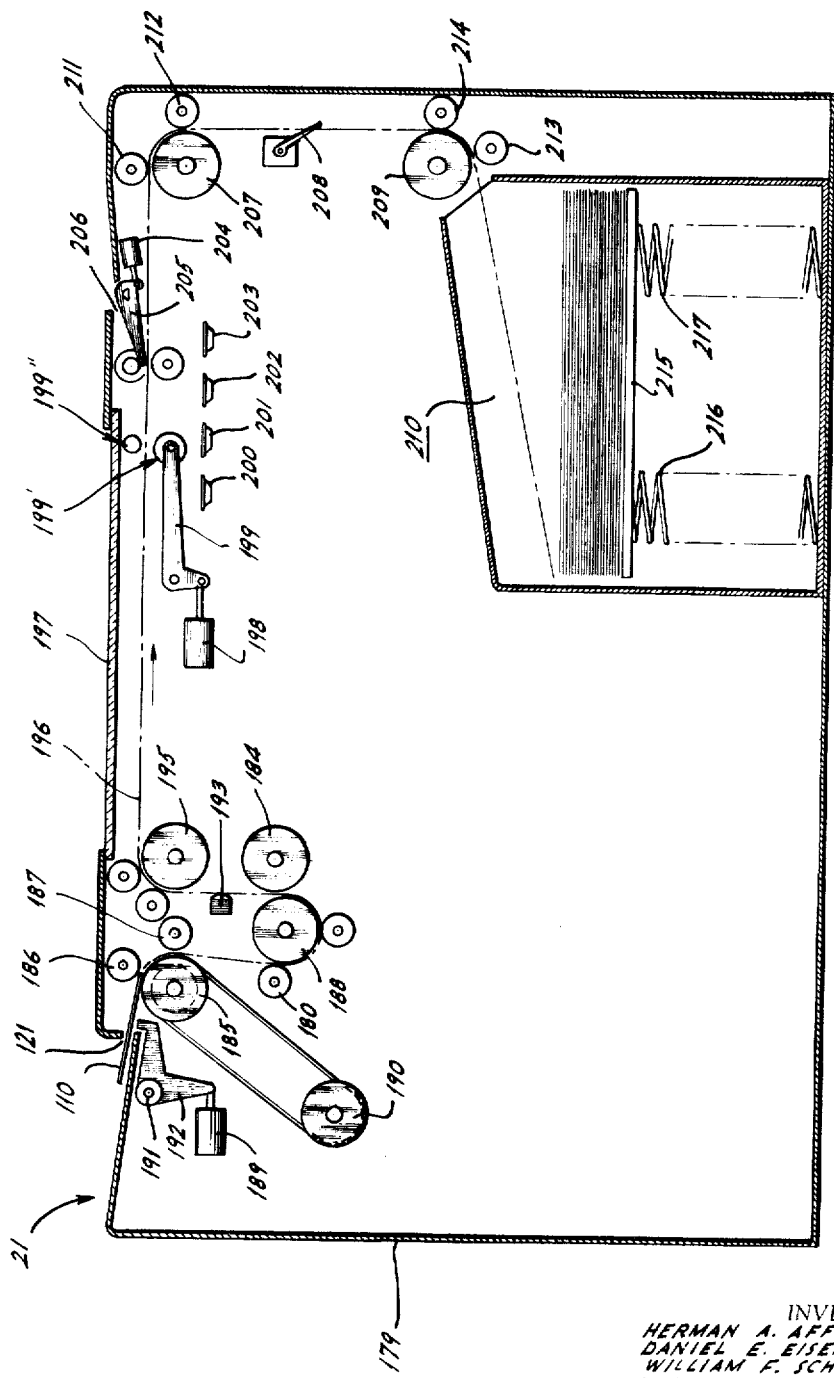

Bilker, Kimmelman & Moyerman
ATTORNEYS

United States Patent Office 3,505,646
Patented Apr. 7, 1970

3,505,646
AUTOMATIC PARIMUTUEL WAGERING SYSTEM
Herman A. Affel, Jr., Philadelphia, Pa., Daniel E. Eisenberg, Cherry Hill, N.J., and Arthur D. Hughes, Gladwayne, William F. Schmitt, Wayne, and Franklin W. Kerfoot, Jr., Newtown Square, Pa., assignors, by mesne assignments, to Auerbach Corporation for Information Sciences, Philadelphia, Pa., a corporation of Pennsylvania, and Great Lakes Carbon Corporation, New York, N.Y., a corporation of Delaware
Filed Oct. 21, 1965, Ser. No. 499,261
Int. Cl. G06f 1/00
U.S. Cl. 340—172.5
15 Claims

ABSTRACT OF THE DISCLOSURE

This data processing apparatus for pari-mutuel betting includes a plurality of ticket issuing (and/or receiving) machines located at predetermined points. A bettor takes a betting slip or equivalent and places marks on it corresponding to the horse number, the race number, the amount bet, and the "pool." This betting slip is placed in the ticket machine which scans it and conveys signals in series to a general purpose computer through intermediate signal routing and processing stages. The computer sends back signals to the machine indicating the proper amount to be collected from the bettor and when the bet is paid the machine operator actuates a switch which enables the machine to print a ticket with the wagering data in printed and invisible (magnetic) form. At the end of the race, the winning bettors take their tickets to the ticket machine wherein each ticket is scanned to produce signals that are sent to the computer for verification and processing. The computer sends back signals to the machine which sets up a transient visible display corresponding to the magnetically recorded information on the back of the betting ticket so that the machine operator can compare the printed portion of the ticket with the invisibly recorded wagering data. If the comparison stands up, the operator presses an appropriate button and pays out the amount of money indicated by signals returned from the computer upon scanning of that betting ticket.

---

This invention relates to data processing systems and in particular to a data collection and distribution system having great utility in automatic wagering installations, especially in automatic parimutuel wagering systems.

Racing, especially horse-racing, has become increasingly popular over the years, a phenomenon accelerated by a more affluent society, more leisure time, and legalized and controlled betting. However, it is a fact that practices and equipment for handling wagering have, by and large, not made commensurate progress in technology, speed, efficiency or cost. With increased attendance at race events has come an increasing need for race-track personnel such as ticket sellers and cashiers, etc. As wages have risen, the race-tracks have been caught in a profit squeeze. In many instances this squeeze is aggravated by the fact that the race-tracks are state-sanctioned and must pay specified amounts or percentages to the state. Often these amounts are determined by political considerations which make it extremely difficult to obtain reductions therein.

Conventionally, each track includes a large number of betting windows each manned by a ticket seller. These windows are customarily classified according to the amount of the bet that they can accept and also by the pool, i.e., win, place, show. Thus, there are certain windows for placing a $2 bet on a horse to win or to show, etc., others for placing a $5 bet in a particular pool, still others for a $10 bet, and so on. If a person desires to make several bets of different amounts and pools he must go to several different windows and wait in line at each one until his turn. At these windows the bettor indicates to the seller the number of the horse in the upcoming race in which he wishes to place his bet, the amount he wishes to bet, and the number of bets he wishes to make. He then gives the requisite money to the seller who then issues him one or more betting or parimutuel tickets. As the bets are placed, the information from each window is fed to an automatic totalizer with perhaps an associated central computer which calculates the odds and pay-offs and the results thereof are displayed on appropriate boards opposite the grandstands. After the race is over holders of winning tickets must go to designated cashing windows for payment in accordance with the date on their winning tickets.

Such conventional systems may require at a single track hundreds of ticket sellers and ticket cashiers. In addition, the procedures presently employed often result in long lines forming before the selling and cashing windows. Present systems also require a large amount of physical space to accommodate the large numbers of personnel involved.

While there have been a number of attempts to improve existing practices for betting which involved a data processing system, they possessed disadvantages which have militated against their wide acceptance.

One proposed system contemplates the use of a number of betting machines disposed throughout the spectator area. The spectator buys a betting card of a certain denomination, places it in one of the betting machines, and presses certain buttons that operate printing, punching or other devices that impress certain wagering data into the card. The card is then "read" by appropriate transducing devices that generate corresponding signals that are ultimately sent to a central data processor. After the race, a winning bettor takes that betting card to a cashier's station which includes a machine for reading the betting card. The machine generates signals upon reading the card which are used for comparison in that machine with signals previously stored in the central data processing unit. The information from the processor and the information in the card, if coincident, provide the cashier with a validation signal that tells him it is all right to pay off on that betting card.

To the extent that the bettor solely actuated and controlled the betting machine without human supervision, this system is considered to be susceptible to fraud, forgery, and abuse of the betting card machine. Furthermore, it required large numbers of personnel to individually sell each betting card to the bettor. Also, the nature of the betting card, printing or punching machines in this system was such that long runs of many wires from each betting machine to the intermediate and final stages of the data processing system were required. The system also required, in addition to the main storage at the central data processor, a number of temporary storage means between the betting machines and the central processor for servicing a designated number of betting machines.

While automatic wagering systems could be devised which have a number of betting ticket (actually it is a receipt for a bet placed) issuing machines that operate strictly in a predetermined synchronous relation under the control of a central data processor, this would require the machines to have high precision components and to be all practically identical in their performance. Consequently, the cost of such machines might well be beyond the reach of most race-tracks.

It is therefore among the objects of the present invention to provide an overall data collection and distribution system, especially for automatic wagering systems, which includes the following features compared to present or proposed systems:

(1) Reduction of the numbers of operating personnel.

(2) Increasing the speed of betting and/or pay-off operations.

(3) Reduction of the length of lines of bettors waiting to place or cash bets.

(4) Dual-purpose machines that can be used for placing bets and issuing parimutuel tickets as well as for cashing winning betting tickets.

(5) Greater protection against forgery, fraud, or other attempts at cheating.

(6) Reduction in the number of channels and/or wires between each betting (ticket issuing) machine and the other components of the wagering data processing system.

(7) Less expensive types of betting machines.

(8) Fewer data storage facilities between the betting machines and the central data processor.

(9) A betting system in which a machine-readable betting ticket is produced having visible wagering data and invisible wagering data contained therein.

(10) An automatic betting system in which there is a reduced dependence on the verbal, visual and mathematical capabilities of the people involved, i.e., the bettor, teller, and cashier.

Still other objects of the present invention will occur to one skilled in the art on perusal of the drawings, specification and claims herein.

In accordance with the present invention, a betting system is provided in which means are provided for producing electrical signals corresponding to wagering information contained in a physical medium such as a marked betting slip. The system also includes means including data processing means for producing a physical record, such as a betting ticket, which contains that wagering information in a visible form and also in a normally-invisible form.

As one feature of this invention, the electrical-signal-producing means comprises a ticket issuing machine to which a betting slip, pre-marked by the bettor, is applied. The machine reads the slip and transmits the information to a central general purpose computer which thereupon instructs the teller how much cash to receive and then, at the teller's instance, produces a betting ticket having the bet data printed on one side and bet data recorded invisibly on the other side with other information for accounting and/or forgery detection.

According to another feature of this invention the ticket issuing machine may be made to include a mechanism for use when a winning ticket is proffered at a cashing station. The mechanism reads the invisibly recorded data from the betting ticket and, in cooperation with the computer, translates that read information into visible form enabling side-by-side comparison with the wagering data printed on the ticket.

Still another feature of the present invention is the fact that there need be only two channels between the ticket issuing and/or receiving machine located at a betting or cashing station and the other data-processing components located at a point remote therefrom.

It is another characteristic of the present invention that the ticket issuing and/or receiving machines need not be exactly alike, high precision electro-mechanical devices regulated by a master clock in the computer. Instead, each is constructed to send wagering data read from a betting slip to the computer at its own individual pace. When the machine is to receive information from the computer to be printed on the ticket it sends a train of pulses at its own speed to the computer and for each pulse the computer supplies it with data bits.

The invention also comprises a system in which information sent to or transmitted by the computer is accomplished on a bit-by-bit serial basis and appropriate memory word in the computer are extracted and examined for each bit received or transfitted by the computer and then replaced in the computer memory. This helps to avoid the necessity for data storage intermediate the ticket issuing and/or receiving machines and the computer and enables considerable simplification of the required circuitry.

FIGURE 1 is a block diagram of an overall automatic wagering system in accordance with one form of the present invention.

FIGURE 2 is a block diagram of one component of the system illustrated in FIGURE 1.

FIGURE 4 is a block diagram of yet another component of the system shown in FIGURE 1.

FIGURE 5 is a block and schematic diagram showing more details of the component illustrated in FIGURE 4.

FIGURE 8 is a schematic diagram of two of the components shown in FIGURE 6.

FIGURE 9 is a schematic diagram of another component of the block diagram of FIGURE 6.

FIGURE 10 is a schematic diagram of still another component of the subsystem shown in FIGURE 6.

FIGURE 13 is a plan view of the top of a betting and pay-off machine usable in the system shown in FIGURE 1.

FIGURE 16 is a view of one sub-assembly of the betting machine shown in FIGURE 13 as viewed along the line 16—16 in the direction indicated in FIGURE 13.

FIGURE 1—GENERAL SYSTEM OPERATION—BETTING

Figure 3:
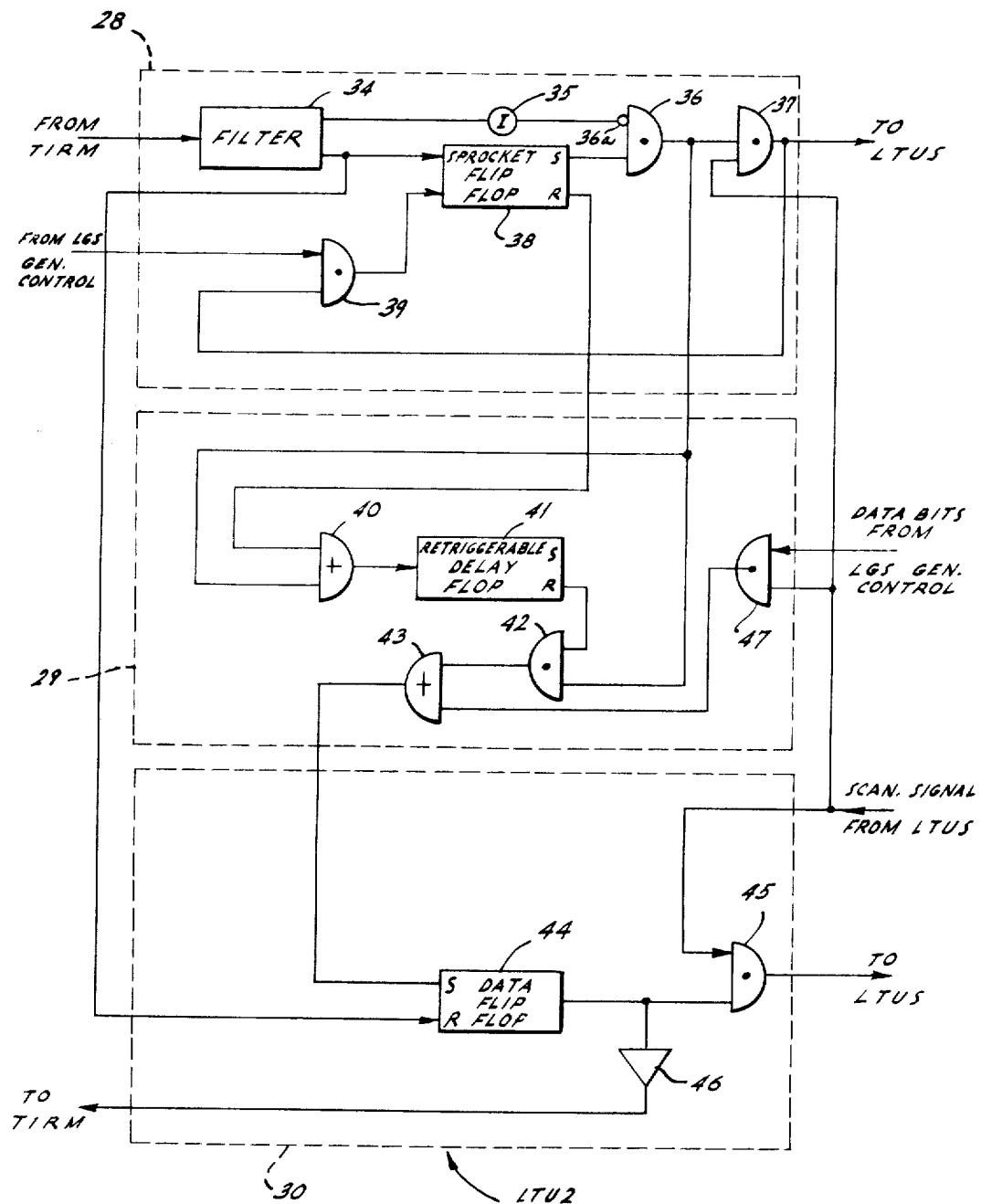
FIGURE 3 is a block diagram of another component of the system shown in FIGURE 1.

Referring to FIGURE 1 there is shown one form of the invention as embodied in an overall automatic parimutuel betting system. There are shown a predetermined number of ticket issuing and receiving machines 1 (termed "TIRM's" hereinafter) which are disposed at any desired number of convenient locations. In one form, the TIRM's are located at a number of stations at the race track. Each station having a TIRM can accept bets of various amount on any horse, and for any desired race. At each station there may be an attendant or "teller" in charge of the TIRM. If the station is just intended to enable the placing of bets, the machines need not include a portion which receives an already issued parimutuel ticket prior to cashing it. In this case, the machine is just a ticket issuing machine or "TIM." Those stations which are equipped with dual-purpose TIRM's ordinarily do not perform ticket selling and cashing functions simultaneously but rather, as the cashing and selling demand varies, the station's function is switched accordingly.

In order to place a bet, a customer obtains a betting slip 110 (see FIGURE 11) at any of a number of readily available points. They may, for example, be attached to the racing program, or be located in numerous bins scattered around the track, or even at off-track locations. These betting slips have no value in themselves but are merely used to record the customer's choices. The customer marks the betting slip for a selected horse number, pool, dollar amount, etc. by using a magnetic pencil, for example. He then takes it to a station and inserts it in an appropriate slot 121 (see FIGURE 13) in the TIRM (or TIM) as the case may be. The TIRM senses the presence of the betting slip and draws it in simultaneously, reading the information marked thereon as it does so. This information is transmitted bit-by-bit as it is being read in the form of a message to the general purpose computer 5 ("GPC" hereinafter) via intermediate processing stages. These stages include a number of line termination units 2 ("LTU's" hereinafter), there being one LTU for each TIRM. These stages also include the line termination unit scanner 3 ("LTUS" hereinafter) and the line group scanner 4 ("LGS" hereinafter). Ordinarily only the TIRM will be located at the station, the general purpose computer and the intermediate stages being located at a point remote from the stations. TIRM's are linked to their respective LTU's by a single "receive" line and a single "transmit" line for receiving and sending messages to the GPC 5 respectively. The information is received by the GPC 5 which checks to see whether the slip has been properly made out. If it is, the GPC computes the total cash to be collected from the bettor and includes this in a message which is then transmitted bit-by-bit back to the TIRM by the intermediate processing stages. This return message has a part which signals the appropriate portion of the TIRM, namely the pay or collect display windows 122, 123 to display to the teller and to the bettor the amount of cash to be collected for all bets then being placed by that bettor.

Under certain circumstances, the GPC will signal the TIRM to reject the proffered betting slip. For example, if the betting slip has been improperly marked or if the horse selected has been scratched, or if the race designated has already been run (where the betting slip allows the patron to insert the number of the race) the TIRM will respond to an appropriate reject message from the GPC by ejecting the slip through betting slip reject slot 206. This will cause the "reject" indicator 296 to be illuminated. Optionally, the teller in charge of the TIRM may, upon visual observation of the betting slip in the betting slip viewer 197, cause the slip to be rejected by pressing reject button 128.

The bettor then pays the teller the amount of money indicated in the collect display windows 122, 123 and when the teller confirms the receipt of the correct amount, the teller presses a release button 125 which transmits a message to the computer requesting the latter to send it (the TIRM) a message via the intermediate stages 2, 3 and 4. If desired, the acceptance of money may alternatively be made partially or wholly automatic by utilizing bill reading and coin input machines actuated by appropriate signals from the GPC. When the GPC receives the ticket issuing request, it transmits a message bit-by-bit back to the TIRM instructing the latter to print a parimutuel ticket 140 (FIGURE 14) which includes the wagering data from the betting slip and to record on its back (FIGURE 15) certain information including the wagering data in an invisible form, e.g. magnetically. This message also causes the TIRM to set up a display in ticket comparison window 254 which shows the bettor and the teller the data sensed by the TIRM after reading the betting slip (which still remains visible through viewer window 197).

Provision is also made for sequentially processing a number of different betting slips inserted in sequence into the TIRM by a single patron and for receiving a number of betting tickets in sequence. The teller presses "add" button 129 which causes the GPC to total the amount of all these betting slips and send a message to the TIRM for displaying in displays 122, 123 the total amount to be collected from that bettor.

FIGURE 1—GENERAL SYSTEM— TICKET CASHING

At some time after a particular race on which the bet has been made is over, the holder of a winning ticket takes it to any available station where there is a cashier and a TIRM. The ticket holder deposits his ticket in slot 126 whereupon it is transported past a magnetic transducer which reads the information recorded magnetically on the back of ticket 140 and sends it to the GPC. The GPC checks this information against winning race data stored therein and if it is a valid winning ticket, causes the TIRM to set up in a form visible through ticket comparison window 254, which preferably is a magnifying window, the information read from the magnetic stripe 146. The GPC also signals the displays 122, 123 the amount of pay-off on that ticket. The inserted winning ticket appears in the right half of the window and the set-up indicia appears in the left half so that both can be compared in side-by-side fashion. If they correspond to one another, the cashier presses the release button 125 (or add button 129 if more than one ticket of the same holder is to be cashed) and dispenses the proper amount of money. If desired, the dispensing of money may alternatively be made partially or wholly automatic by utilizing bill and coin issuing machines actuated by appropriate signals from the GPC. The ticket is then cancelled and stored in a stacker within the TIRM.

However, if the ticket presented does not stand up under visual comparison the cashier can press the reject button 128 whereupon the reject indicator 296 will be illuminated and the ticket passes out of the machine via a reject slot 202. Similarly, if the computer determines from information obtained from the magnetically recorded stripe that it is an improper ticket, it will send back to the TIRM a reject message which causes the TIRM to eject the ticket and the "reject" indicator 296 will be illuminated.

FIGURE 1—AUXILIARY COMPONENTS

In addition to the stages 1 through 5 whose functions have already been broadly explained, the overall system includes a number of display, data processing, control and accounting components. The most important of these are the data processing components associated with the GPC. These cooperate to coordinate the functions of all of the other components or stages of the system. A conventional computer console 6 is associated with GPC 5. There is a selector switch 7 which enables the GPC to be coupled to the various display, control or accounting components as desired. The switch 7 is controlled manually from the system control console 20 which is intended to be used by the management of the automatic parimutuel system to monitor and control the overall system. The console 20 may be comprised of one by two contacts allowing any of the components coupled to it to be switched to either of redundant computers which may comprise the GPC. It will include TV monitors such as the TV monitor 11 to assure proper operation of the overall system and TV monitors to indicate race information to patrons indoors. The console 20 will be equipped with status, loading, power and error indicators as well as switches for controlling equipment transfer, correction of the infield display 8, starting, restarting, etc. There is also an operation control console 19 intended for use of the management of the track. It will contain TV monitors and other displays for checking, status and validation purposes. It will also include controls which permit manual intervention under certain circumstances. Console 19 has typewriters which type out the new pool totals and odds which are then verified and sent to the infield display 8. Console 19 also controls the TV camera 8 and can turn the infield display 8 off or on (although corrections are accomplished by the console 20). After a race, the order of finish is displayed on the display 8 after entry through operation console 19. The latter prints the payoffs on its typewriters for verification and then the GPC sends the payoffs to the infield display. Operation control console 19 is also used to stop selling of tickets at the TIM's and TIRM's when a race has begun. Both the operation console 19 and the system console 20 have some of the same equipment. Moreover, each of the consoles has computer-controlled typewriters and TV monitor display units as previously stated. Each console receives data from and transmits data to the GPC via the selector switch 7. The consoles 19 and 20 are used cooperatively. That is, when the track management observes a malfunction by means of operation control console 19, they notify the management of the automatic wagering system who then, by inspection of system console 20, can determine whether it is due to an equipment malfunction and, if so, take the necessary corrective steps.

The infield display 8 consists of one or more large boards showing numerical and alphabetical information visible from the stands and surrounding areas. It will include such data as the time, the post-time, the number of the race, the odds, the pools, the results, and the payoffs. The display 8 may include, for example, an array of lights for each digit or character. There is also provided at least one TV camera 9 focused on the infield display whose output is fed via switch 10 to a TV monitor 11, switch 10 and camera 9 being controlled by signals from the GPC via the selector switch 7. The monitors are located at desired points such as at the operation control console 19 and at the system control console 20.

There may also be provided a house odds board display 17 coupled to display 8 for giving information on the odds to patrons throughout the general track area including restaurants, lounges, etc. Additionally, there may be a station odds board display 18 coupled to display 8 which carries substantially the same information as the house display 17 to patrons, tellers and cashiers at the various betting or betting-cashing stations. The house and station displays may also be produced by an array of lights for each digit or character. There may also be an accounting and master processor display (not shown) for conveying information to money handling and accounting supervisors as well as computer operations personnel.

The GPC 5 is made to permit simultaneous data processing and a flexible interrupt system as will be explained in some detail later. It is so constructed as to allow simultaneous use of the TIRM's and two tape handlers, such as the tape handlers 15 and 16, by means of tape control unit 14. The latter unit selects the particular tape handler and processes the data between the GPC memory and the tape. The tape handlers are medium-speed devices having de-mountable tapes incorporating backward and forward read instructions. The tape system produces a complete record of each day's transactions on a reference tape.

Connected to the GPC via the selector switch 7 are a betting slip accounting machine 12 and a parimutuel ticket accounting machine 13. The betting slip accounting machine accepts betting slips in batches and reads them. In conjunction with the GPC (or with a standby processor) it tabulates for any station and for any race the number of tickets sold by pool, by horse and by denomination as well as the corresponding dollar amounts. The ticket machine 13 tabulates, in conjunction with the GPC, for each cashing station for each day the number of tickets cashed by denomination, by race and pool and by corresponding dollar amounts. Both types of machines are used to reconcile discrepancies between the cash balances reported by the GPC for each station and the cash actually turned in by the tellers and cashiers.

There are also a number of line printers 25 and 26 connected to the GPC via switch 7. There are also a number of typewriters 22, 23, and 24 which are connected to the GPC via typewriter distributor 21 and selector switch 7. The typewriters receive data from and also interrogate the components associated with the GPC in response to an operator's manipulation of the distributor 21. The printers and the typewriters prepare printed reports, both routine and special. Two tasks they accomplish are to prepare cash accounting and reconciliation reports and to prepare auditing information for the state or other supervisory agency.

DETAILED SYSTEM OPERATION—FROM TIRM TO GPC

The foregoing general explanation of an overall automatic wagering system was presented as useful illustrative background for the explanation of the principal parts of the present invention, i.e., the data processing involved in producing a machine-readable parimutuel betting ticket in response to a betting slip and in processing a winning ticket prior to payoff on it. For these operations, the main components of the system are stages 1–5 shown in FIGURE 1. There may be any desired number of TIRM's (or TIM's) 1, say 100–500, depending on the size of the installation. Each TIRM or TIM includes apparatus for producing signals corresponding to wagering information that is to be sent to the GPC 5. In one form, the TIRM 1 may be electro-mechanical and include means for transporting the pre-marked betting slip 110 into successively different positions in which the marks thereupon are translated step-by-step into corresponding electrical data signals. For this purpose it may be equipped with optical or magnetic transducers, for example. It also will include means for producing timing signals for indexing the successive positions of the betting slip as it passes through the TIRM.

Associated with each TIRM (but located remote from it at the central data processing point) is an LTU 2 whose function is to (1) convert information in the form received by it from the TIRM into a form which can be processed by the subsequent stages 2–5 and (2) provide electrical buffering for transmission of the data over the necessary distance to the TIRM's and minimize the number of wires required between the TIRM and the LTU. The TIRM's produce output signals, which include both data and timing components which are sent to their respective LTU's over single lines or channels. It is the function of the LTU to identify or recognize the data components and segregate them from the timing components. Another line or channel from the TIRM to the LTU is used for transmitting information back to the TIRM from a subsequent component of the system and also for checking purposes.

The outputs of a group of LTU's, say sixteen, for example, are coupled to the LTUS 3. The LTUS includes means for generating scanning signals which are applied in a predetermined sequence to the outputs of its associated LTU's. If the LTUS 3 detects the appearance of a data bit in the output of any particular LTU, (whether that bit is wagering data or timing data) it will stop scanning and transmit that bit to its associated LGS 4. The LGS's 4 are coupled to the outputs of a group of, say thirty-two LTUS's. Like the LTUS's the LGS's also include means for generating sampling signals for sampling all of the outputs of the LTUS' connected to their input. Also, like the LTUS' when the LGS detects a data pulse (bit) in the output of any particular one of the LTUS', whether that bit represents wagering data or timing data, it stops its scanning operation. In both the LTUS' and the LGS' there are counters that respectively record counts indicative of which TIRM (or LTU) produced the data output pulse and which LTUS passed it along to the LGS.

The address of the particular TIRM (or LTU) as defined by the counts in the LTUS and in the LGS, is then sent to GPC 5 to obtain access to the word stored in the GPC memory at that address. That word in the memory is then transferred into the LGS where it is examined.

Upon examination by the LGS of certain predetermined bits in the memory word received and temporarily stored by the LGS, the latter can determine whether it is to receive data from the LTU or to transmit data to the latter. The LGS thereupon (when information is being sent to the GPC) modifies the memory word in response to receipt of a "one" or a "zero" pulse from the LTU via the LTUS. The LGS also updates the count in the word. The LGS then sends a pulse to the computer telling it to store the up-dated count and the modified memory word in the original memory location as determined by the address information from the particular LTUS and the particular LTU. The LGS then sends a "clear" signal to the LTU. Then the LTUS and LGS resume their scanning operations to detect other data bits appearing in the outputs of other LTU's. The system is so constructed that wagering data from all TIRM's can be processed simultaneously if need be. Furthermore, all TIRM's are scanned by the LTUS in the interval between successive signals from any one TIRM.

When the LGS detects, by counting the number of sprocket pulses received from the TIRM since the beginning of the message, that the betting slip has been completely "read" by any given TIRM, the LGS will signal the computer that it is the end of the message and the computer then is interrupted, looks at the address of the particular TIRM involved and records it. Then the computer signals the LGS and the LTUS to continue their respective scanning operations.

DETAILED OPERATION—GPC TO TIRM

Within a very short time after the bet data message from a particular TIRM has been entered into the computer, when the computer has time to process it, the word in the memory at that address corresponding to that TIRM is examined. The computer (GPC) interprets the information which it has stored in the memory locations for that particular TIRM in order to compose a reply which will contain three types of information, namely (1) a bit identifying the direction in which the message is to go, i.e., back toward the TIRM ("receive-transmit" bits), (2) bits containing "pre-message" data, i.e., instructions to the TIRM as to the nature of the message which follows, and (3) the actual message itself, i.e., the bits containing the actual numbers or characters that the TIRM will display or print on the betting ticket. An example of "pre-message" data would be bits indicating that the actual message which follows concerns the amount to be collected from the bettor and therefore will be routed to the amount indicator in the TIRM. This data may alternatively specify that the message which follows is to go to the printing sub-assembly of the TIRM, etc.

After the computer has prepared the message including the three types of information just described, the LGS examines it so as to be able to signal the TIRM that it desires to transmit a message to the latter. In one form of this invention, no message is sent to the TIRM except in response to timing signals sent by the TIRM to the GPC. That is to say, neither the GPC or any other component operates the TIRM's in synchronism with a master clock, but rather each particular TIRM elicits each data bit of the message intended for it by sending to the GPC one of a train of timing or sprocket pulses. However, such timing or sprocket pulses must first be requested by the LGS which accordingly sends an appropriate pulse to the TIRM. On receipt of this pulse the TIRM starts to send to the LGS a train of sprocket pulses. Special circuits ("force-address" circuits) are provided between the GPC and the TIRM's to enable a message to be transmitted to any selected TIRM at any desired time provided the TIRM is in a quiescent state.

Each timing pulse generated by the TIRM will be detected by the LTUS and the LGS in the same manner as a data pulse generated when a betting slip is being read by the TIRM. That is to say, the LTU's 2 are scanned by the LTUS's 3 and all of the latter are scanned by the LGS 4. The message from the GPC proceeds to be transmitted bit-by-bit back to the TIRM through the intermediate stages in response to the respective sprocket pulses generated by the TIRM. For each bit transmitted to the TIRM, the memory word is extracted from the memory, interpreted, modified and updated and then returned to the memory. This feature enables the LGS to use one so-called "interpreter" circuit for several hundred TIRM's. Without this feature an interpreter would be required for each TIRM and would render the system considerably more costly. At the end of the message the LGS sends a signal to the computer to indicate that transmission to the TIRM (LTU) has been completed. Meanwhile, of course, the GPC is simultaneously attending to the processing of many other messages to and from the TIRM's and other components of the overall system.

It will be noted from the foregoing that only two lines are required from each TIRM to its associated LTU, one to send data to, and one to receive data from the LTU. Furthermore, in the particular form of the invention illustrated, the conveyance of information from a TIRM to the LTU is self-sprocketed. That is to say, the sprocket and data pulses are sent on the *same* line from the TIRM to the LTU. The LTU includes circuits for distinguishing between these two types of signals and forwarding them separately to the other intermediate stages.

DETAILED EXPLANATION—BETTING SLIP

Figure 11:
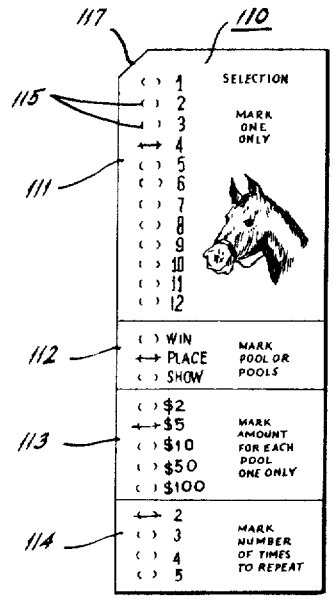
FIGURE 11 shows the front of a betting slip used in one form of the present invention.
Figure 12:
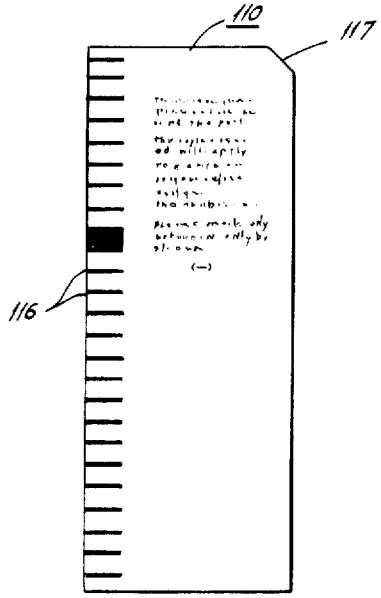
FIGURE 12 is the reverse side of the betting slip shown in FIGURE 11.

In explaining the details of the system, reference will now be made to FIGURE 11 and FIGURE 12 which show one form of the so-called "betting slip" 110. As shown, the betting slip 110 is a piece of paper or light cardboard having on one side four main divisions 111, 112, 113 and 114 corresponding to (1) the number of the selection (horse) on which the bet is to be placed, (2) the pool, (3) the denomination of the bet, and (4) the number of times the bettor wishes to place this same bet. Optionally, it can contain a fifth division which includes the number of a race. This fifth division may be utilized if it is desired to allow customers to bet on races other than the next one to be run. The slip may also contain different divisions such as for daily double and/or still other divisions for any desired purposes. The back of the betting slip is as shown in FIGURE 12 and contains along its left edge a row of horizontal lines 116 which are used to generate synchronization or timing signals as the slip is being "read" by the TIRM. These lines for example, may be read by an optical scanner or, if they are made by a magnetic ink, by an appropriate magnetic transducer, to generate the timing signals. Alternatively, holes could be punched and used to generate the timing signals.

The bettor is instructed to mark one horizontal pencil line between any desired single set of parentheses in each division. The marking may be done with magnetic lead pencils or regular lead pencils or other appropriate mediums. In the illustrative example as shown in FIGURE 11, the bettor has chosen the fourth horse to place and has bet the amount of $5 two times on that horse.

DETAILED EXPLANATION—TIRM

The bettor then places the slip in the "Betting Slip Insert" slot 121 (FIGURE 13) in the TIRM. Suffice it to say, a TIRM is so made that when the betting slip is placed into it, magnetic (or other) transducers, for example, will detect the wagering information that is to be transmitted to the computer 5.

The TIRM draws in the betting slip 110 and generates two types of pulses when it reads it. For each position that possibly could be marked by a bettor, a timing pulse will be generated by preprinted sprocket marks 116. If, within the set of parentheses in that possible position no mark appears, the output of the TIRM will be a short pulse, say 1 ms. in duration, which will be treated as a "zero" for example. Thus, in the case of a betting slip marked as shown in FIGURE 11, pulses one millisecond long would appear at the output of the TIRM as the TIRM read the first three numbered positions corresponding to the various horses. Since there is a mark inserted opposite the numeral "4" in division 111, the TIRM will in that position generate a long pulse say 3 ms. in duration, which will be considered as a "one" pulse.

DETAILED EXPLANATION—LTU

The "zero" and "one" pulses are applied to the LTU 2 via the input to the sprocket and data control 28 as shown in FIGURE 2. Within the control 28 filtering of the pulses from the TIRM may occur as well as pulse-shaping and impedance matching to the subsequent lines, for example. Also, the control 28 includes a gate which enables the sprocket pulse from the TIRM to be transmitted to the subsequent LTUS 3 whenever the latter applies a scanning or selecting pulse to that LTU. The shaped incoming pulses from the TIRM are also applied via the control 28 to the "bit recognizer" 29 which is a pulse-width discriminator for distinguishing between "ones" and "zeros."

The output of the bit recognizer 29 is applied to data store 30 which is constructed to produce an output signal that is applied (when that LTU is scanned by a selection pulse from the associated LTUS) to the LTU scanner 23 only when a "one" appears in the output of the LTU. In addition, a path is provided from the data store 30 back to the TIRM for two main purposes. The first is to feed back "ones" to the TIRM in response to each "one" pulse transmitted from the TIRM to the LTU. This is done for checking purposes. The second is to enable a "one" to be transmitted from the computer via that LTU to a particular TIRM when the computer desires to communicate with that TIRM, (i.e., "force address").

The operation of the circuit of the LTU, which is shown in FIGURE 3, will now be explained. Whenever the TIRM is sending information to the GPC, there will be an input to filter 34 which performs any of the desired filtering, shaping or impedance matching functions. There are two outputs from the filter 34. One of them goes through an inverter 35 to the "inhibit" input 36a of AND gate 36. The other output goes to one input of sprocket flip-flop 38.

Whenever a pulse from the TIRM is received, regardless of whether it is a "one" or "zero," it causes the flip-flop 38 to be set so as to apply a pulse to one input of the AND gate 36. However, the gate 36 will produce no output signal because of the presence of the negative signal at the input 36a. Thus, the pulse from the TIRM cannot simultaneously be applied via AND gate 37 to the following LTUS even if there is applied to the other input of gate 37 the scanning or selection signal from that LTUS. Consequently, while a TIRM is sending a pulse to its LTU, no pulse from the LTU can be forwarded to the following LTUS via gate 37.

Upon the disappearance of the pulse from the TIRM and appearance of the selection signal, not only is the sprocket pulse forwarded to the following LTUS via gate 37 but the signal in the output of gate 37 is also applied to one input of AND gate 39. To the other input thereof, a "clear" signal from the LGS is applied so as to furnish a signal to flip-flop 38 which will reset it. Upon its being reset a pulse will be applied to one input of OR gate 40. To another input thereof all pulses appearing in the output gate 36 will also be applied.

When a 3 ms. (or "one") pulse is received by the LTU from the TIRM, the flip-flop 41 (which may be a single-shot flip-flop, for example) begins its time recovery a predetermined time, say 2 ms., after the occurrence of the trailing edge of the signal from OR gate 40 which is the same time that the leading edge of the pulse to the filter occurs. After two milliseconds, the delay flop 41 applies a signal to AND gate 42 which also receives a signal from AND gate 36 after 3 ms. Therefore, upon the conjunction of these signals, AND gate 42 will produce an output signal. This signal is applied to OR gate 43 which passes it to data flip-flop 44 to set it. When data flip-flop 44 is set, its output will indicate that a "one" has been recognized by the LTU. This output will be fed back to the TIRM via amplifier 46 as a "check pulse." It will also be applied to the AND gate 45 to be transmitted to the following LTUS upon the simultaneous application thereto of the scanning signal from the LTUS.

If the signal from the TIRM was a short pulse of 1 ms. duration (i.e., a "zero" pulse), the delay flip-flop 41 will not have reset at the end of one millisecond and the gate 36 will open to permit a signal to be applied to gate 42 and OR gate 40. However, the latter will not pass a signal because the delay flop 41 has not yet recovered and is prevented from doing so by the input to gate 40. Thus, no pulse will be applied to set flip-flop 44 and therefore no pulse will be produced by the latter for use as a check pulse to be sent to the TIRM. Similarly, no pulse will be forwarded by flip-flop 44 to the LTUS and the signal applied from the TIRM will be called a "zero."

The LTU is also provided with gate 47 having one input to which the scanning signal from the LTUS is applied. The other input from the LGS (general control 83) is used whenever the computer desires to communicate with the LTU connected to a particular TIRM by sending an appropriate signal to the former. Upon the coincidence of both of these signals, the gate 47 delivers an output signal via the OR gate 43 to set the flip-flop 44. The latter responds by producing a signal which is amplified by the amplifier 46 and sent back to the particular TIRM.

DETAILED EXPLANATION—LTUS 3

The LTUS, shown in FIGURES 4 and 5, as stated earlier, is connected to ony desired number of LTU's. It is designed to scan during communication of data from any or all TIRM's to which it is connected to the GPC and also from the GPC to the TIRM's. Its function is to scan all of the LTU's to which it is connected within a period if time that is shorter than the period of time between successive pulses generated by any TIRM. If the time between successive pulses from a TIRM is 4 ms., for example, the scanning by the LTUS of all LTU's must be completed within that time. It will scan until it finds in the output of one of the LTU's a sprocket pulse derived from the corresponding TIRM output which may either be a short pulse ("zero") or a longer pulse ("one"). When it does find an active LTU, it stops and transfers the address identifying the particular LTU to the GPC memory via the LGS.

The heart of the LTUS is the counter 52 which is coupled to a conventional decoder 50 and to gates 51. The counter is actuated by stepping signals from the sprocket control 53 to which clock pulses from a clock pulse source (not shown) are applied. If the counter 52 is a five-place counter, for example, the five separate input lines to the decoder 50 will transmit pulses which will be converted by decoder 50 to signals on its output lines. These output signals will be applied successively to different LTU's so that all of the LTU's will be scanned one at a time in a predetermined sequence. These scanning signals will operate to stop on an active LTU (one with a sprocket pulse present) and transfer the sprocket pulse and data pulse ("zero" or "one" derived from the TIRM output) in the output of the LTU to the LTUS.

At the same time that the counter is providing an input to the decoder 50 it is also providing inputs to the gates 51. When, in the course of the scanning, the selection signals applied to the various LTU's detect an active LTU (that is, an LTU output with a signal in it) the scanning stops because a sprocket pulse from one of the gates 37 is applied to the sprocket control 53 (gate 60) to prevent further counting. Simultaneously the "one"

or "zero" of the gate 45 is transferred to the data control 54. Then, when a scanning signal from the following LGS is applied to gates 51 and to control 53 and control 54, the count in 52, the sprocket pulse in control 53, and the data pulse in control 54 are transferred to the GPC memory (via gates 71 of the LGS, the LGS sprocket control and the LGS data control respectively).

When the GPC desired to initiate a communication with a certain LTU, the five-bit address of that LTU in code is sent to decoder 50 via the inputs thereto shown in FIGURE 4. Then when a control signal from the general control terminal $i$ is applied to the decoder 50, the latter applies a selection or scanning signal to gate 47 together with the data bit from the LGS (interpreter) to set flip-flop 44 thereby signalling its associated TIRM.

FIGURE 5 is further breakdown of the block diagram of FIGURE 4. It shows a decoder 50 which may be any conventional decoder (similar to decoder 70 in FIGURE 8) for conversion of the five-place output of counter 52 to a selection signal that will be applied in sequence, to the outputs of the various LTU's. The five-place counter 52 may also be conventional and is actuated by a stepping signal from sprocket control 53. (It should be understood that the five output lines of counter 52 go to five inputs in the decoder and five inputs in the gates.) Control 53 includes an inhibit AND gate 60 having an input to which clock pulses from a clock source (not shown) are applied and having inhibit inputs 60$a$ and 60$b$. Gate 60 is coupled via an OR gate and buffer 61 to receive all of the output signals produced by gates 37 of the LTU's scanned by the LTUS. Upon receipt of a sprocket signal from any one of the gates 37 it is applied to the inhibit terminal 60$a$ whereupon the clock pulses can no longer be applied to step the counter 52 which thereupon stops. The data pulse from the corresponding gate 45 of the same LTU is simultaneously applied to OR gate 64 and thence to AND gate 65.

When a selection or a scanning pulse from LGS 24 arrives via OR gate 63 it holds the counter 52 from continuing when the input on 60$a$ is released by being applied to inhibit terminal 60$b$. At the same time, it is applied to transfer information from three different parts of the LTUS to the LGS. It is applied to the AND gates 65 so that the data bit from the LTU may be transferred to the LGS. It is applied to the AND gate 62 so that the sprocket pulse from the LTU involved may be transferred therefrom to the LGS.

It should be remembered that the LGS is interested in knowing which particular LTU the LTUS has detected as being active. Therefore, the LGS must operate to transfer the reading of the counter 52 via the gates 57 and 58 to the GPC for address purposes. Consequently, the LGS scanning signal is also applied to the AND gates 57 to which all of the outputs of the counter 52 are connected as shown. One output of each of the gates 57 is applied to buffer OR gates 58 for transfer to the GPC memory via LGS selection gates 71. Another output of each gate 57 is applied to the other LGS in the system. Other inputs from various other LTUS' in the system are applied to all of the gates 58.

DETAILED EXPLANATION—LGS

Figure 6:
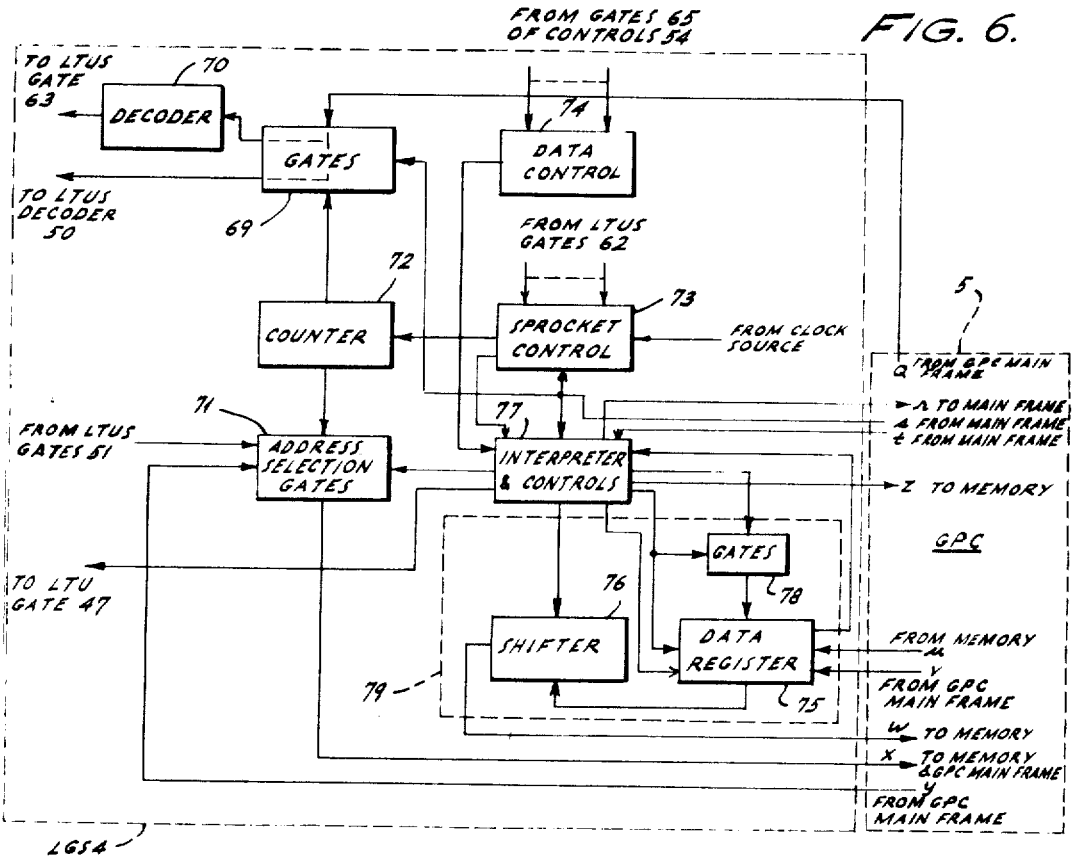
FIGURE 6 is a block diagram of still another component of the system shown in FIGURE 1.
Figure 7:
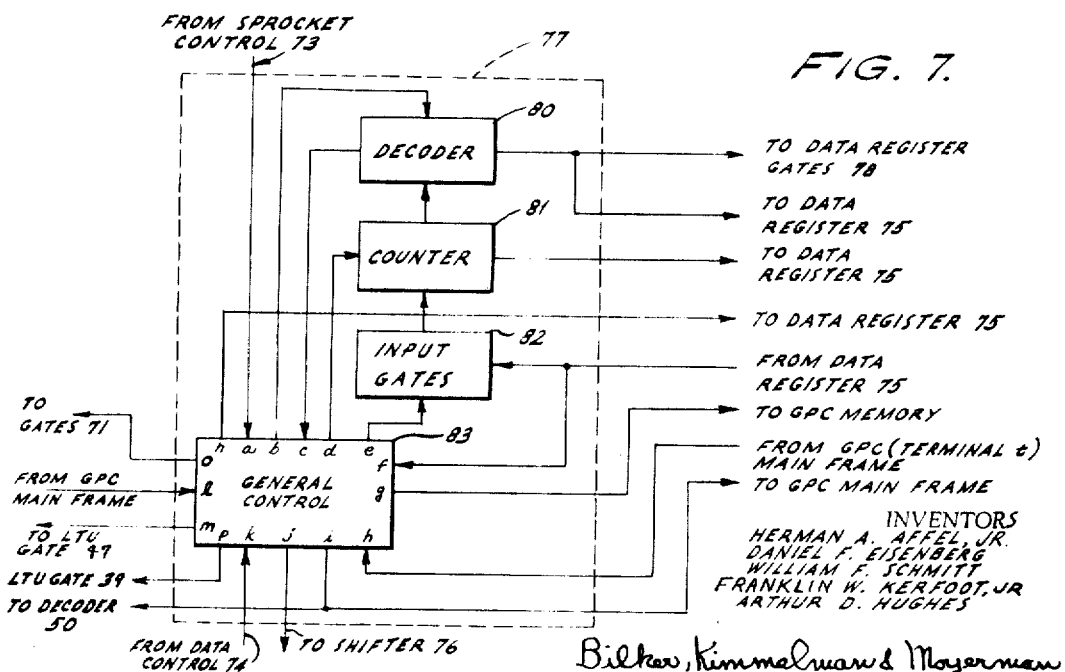
FIGURE 7 is a block diagram of one of the components shown in FIGURE 6.

The line group scanner is shown in block diagram form in FIGURE 6 and various ones of its components are further broken down into schematic and block diagrams as shown in FIGURES 7–10. Like the LTUS, the LGS includes a decoder indicated at the numeral 70 and a counter indicated at the numeral 72. One of the functions of the LGS is to produce a scanning signal which is applied, in predetermined sequence, to the various LTUS' in the system. The counter 72 operates in response to pulses from sprocket control 73 which is analogous to sprocket control 53 of the LTUS. The counter 72 supplies output signals which are applied via gates 69 to the decoder 70. In response to a "select decoder" signal from terminal $s$ of the GPC applied to the gates 69, the latter receives address bits from terminal $g$ of the GPC and transfers them to the decoder 70. In the absence of the signal from terminal $s$, the gates 69 pass the count in counter 72 to the decoder 70.

The output of the decoder 70 is applied to scan the gates 63 of the various LTUS's connected thereto. The scanning signals applied to the gates 63 are then applied to the gates 62 to permit the sprocket pulses from the LTUS to be applied to the LGS sprocket control 73 to stop the counter 72 for selection of the proper LTUS. The scanning signals also enable data bits "ones" or "zeroes") present in the outputs of the gates 65 to be transferred to the inputs of the data control 74 and allow the count in counter 52 to be transferred to the GPC, via gates 51 and 71, for GPC memory addressing.

The output of the counter 72 is also applied to address selection gates 71 so that when an active LTUS is detected by the scanning of decoder 70, the address of the LTUS may be transferred from the counter 72 for GPC memory addressing via gates 71 together with the address of the particular LTU (or TIRM). The output of the gates 71 consists of the (nominal) four-place address from counter 72 and the (nominal) five-place address of the particular LTU which comes from gates 51 of the LTUS. These nine bits form an address for accessing the memory of the GPC 25 (whose location corresponds to the selected LTU and LTUS) and cause a memory word at terminal $u$ to be applied to data register 75 which is shown in the data register assembly 79.

Control 74 has a number of inputs to accommodate the application of the data bits from the various data controls 54 to which this LGS is connected. It has an output which transfers the data bit input from the LTUS to the interpreter 77.

The sprocket control 73 receives the signals in the outputs of the corresponding sprocket controls 53 in the various LTUS'. Sprocket control 73 furnishes a stepping signal to the counter in response to clock pulses from a clock pulse source (not shown). Sprocket control 73 also has an output that transfers the sprocket pulses from the previous stages to the interpreter. There is an input to control 73 from a clock source (not shown) to enable it to advance the count in counter 72. There is also an input to it for a signal from terminal $s$ of the GPC for stopping the application of a stepping signal to counter 72 when the GPC wishes to send a message toward the TIRM. The same signal goes to $l$ of control 83.

The interpreter 77 includes a counter 81 (FIGURE 7) which is used to modify the count from data register 75 of the number of sprocket pulses received from control 73 for the currently selected LTU. In response to the receipt of each sprocket pulse from the sprocket control 73 applied to input $a$ of the general control 83 (FIGURE 7), the general control produces a so-called "memory request" signal at terminal $g$ which is applied to the GPC memory. This signal makes the memory of the computer available to the LGS.

The information sent to the memory for an address will come from the count in counter 72 of the LGS and the count in the counter 52 of the LTUS. This address data is fed to the terminal $x$ of the GPC via the address selection gates 71 in response to a "select memory address" signal applied to the latter from the terminal $o$ of general control 83 of the interpreter 77. A signal from terminal $v$ of the GPC indicates to the gates 71 exactly when the memory is ready to accept the address data. This address information, in conjunction with the "memory request" signal applied from terminal $g$ to GPC terminal $z$, causes the GPC memory to produce at terminal $u$ a memory word for delivery to the data register 75. A "receive memory word" signal is simultaneously sent out by the general control 83 at terminal $n$ to the data register 75 signalling the latter to receive the memory word.

The retrieved data includes the receive-transmit bit, the pre-message bits, the count bits, and the message data bits. The data bits of the word in register 75 are then transferred to the interpreter 77 via counter input gates 82. Another portion of the word, namely the bits which tell in which direction the message is going ("receive-transmit" bits) and the so-called "pre-message" bits are applied to the terminal $f$ of control 83 as well. Control 83 examines the receive-transmit bits to determine in which direction the message is to go. Assuming that the receive-transmit bit indicates a receive operation, the interpreter knows that the data bits in the register 75 must be modified and then sent back to the memory. A so-called "select input to counter" signal is applied to gates 82 from terminal $e$ of general control 83 and causes selected inputs from the register 75 to pass to the counter 81. These selected inputs are the bits which indicate how many sprocket pulses have been received up to that time for that TIRM. The counter 81 has an output which goes to the decoder 80 which sends signals to general control 83 via terminal $c$. These signals inform the control 83 of what is happening, e.g., whether it is the pre-message, message, or end-of-message then being processed. Also, there is an output from the counter 81 which is applied to the register 75 for updating the word after each received pulse.

Different parts of register 75 will be loaded depending upon the count of sprocket pulses in counter 81. By counting the number of these sprocket pulses, it is possible to know which portion of the betting slip is then being read by the magnetic transducer in the TIRM. For example, if four bits of the register 75 are reserved for the twelve possible choices in division 111 of the betting slip 110, it will be known that after sixteen sprocket pulses are counted, the next group of bits in the register will contain information relating to the division 112 of betting slip 119, i.e. the "pool" selected by the bettor. The output of the decoder 80 is applied to register assembly 79, part going to the gates 78 as a "select input" signal and part going directly to the register as a "select clear" signal. The "select input" signal governs how the modification to the word in the register will be made. The latter control signal as applied to gates 78 routes the modifications to selected positions in the register 75 which have previously been cleared by the "selective clear" signal. The modification of the portion of the word in the register is made only when a received "one" pulse from the previous stages of the system is present at terminal $k$. If there is such a "one" present, it causes the control 83 to generate a "control decoder" signal at terminal $b$ which reads out part of the data in the counter via the decoder 80 and applies it to register 75. The word in the data register will accordingly be modified by the output of the decoder 80; if there is a "zero," no change will be made to the word in the data register.

In addition to the foregoing, the control 83 also sends a "control counter" signal from terminal $d$ to the counter 81 for each received sprocket pulse whereby the count in that counter will be sent directly to the data register to update the previous count. The count in decoder 80 is also sent back to terminal $c$ of control 83 to enable the latter to know when to send out control signals such as the "main frame interrupt" signal at terminal $i$. This interpretation and updating of the word in the memory of the GPC is made in response to *each* sprocket pulse generated by a TIRM.

The control 83 also produces at terminal $p$ a "clear" signal which is applied to gate 39 of the LTU 2 to reset flip-flop 38.

After the betting slip 110 has been entirely read, control 83 will generate at terminal $i$ a so-called "main frame interrupt" signal which is sent to the terminal $r$ of the GPC 25 telling it that there is a completed message available in the memory for whatever operation the GPC may wish to do upon it. The same signal is also sent to decoder 50 to signal it to recommence scanning of the LTU's. The memory address, i.e., the readings in the counters in the LGS (72) and in the LTUS (52), will also be sent to the terminal $x$ of the GPC via gates 71 so that the latter can identify which LTU was involved in that receiving transaction. This is accomplished in response to a signal generated at terminal $o$ of control 83 which is applied to gates 71.

When a message is to be transmitted from the GPC 25 to the TIRM a "main frame request" signal will be sent from terminal $t$ of the GPC to terminal $h$ of control 83. A signal will also be applied from terminal $s$ of the GPC to sprocket control 73 which prevents the latter from further stepping of the counter 72. A data word from the terminal $u$ of the GPC (memory) is placed in the data register 75 in response to a "receive memory word" signal sent out from terminal $g$ of control 83. This data word is used to construct an address which is sent to (1) decoder 70 of the LGS and to (2) decoder 50 of the LTUS as a "force address." This address identifies the particular LTU and its associated TIRM to which a signal is to be transmitted from the GPC. This signal to the TIRM is a "one" pulse and after such a pulse is received the TIRM responds by sending a corresponding sprocket pulse train for timing purposes. For each received sprocket pulse, a data bit is sent back via terminal $m$ of control 83 to the gate 47 of the particular LTU associated with the desired TIRM.

At the same time that the address of the particular LTU is sent, the pre-message bits are sent to the data register 75. When each sprocket pulse generated by the TIRM is received at terminal $a$ of the general control 83, the control 83 initiates a "memory request" signal at its terminal $g$ that causes the address bits to be sent to the GPC memory. Then the data word at that address is received, placed in the data register 75 via terminal $v$ and ultimately it is transferred to the interpreter 77. The interpreter examines the transmit-receive bit, finds that it is a "one" and knows that the message is to go back to the TIRM. The interpreter also examines the word for its pre-message content. The control 83 then examines the count contained in the data word by placing that portion of the data word into the input gates 82 to counter 81 in response to a "select input" signal applied from terminal $e$. The count is modified in the counter 81 in response to a signal from terminal $d$ and the modified count is then returned to the data register 75. By knowing what the count is, the field is known. That is to say, those bits in the register are known which have information relating to a particular condition or fact such as the numbers of all horses in a given race, the possible denominations of bets, or the various pools, etc. Consequently, each field or class of bits can be selectively placed into the input gates 82 from the register 75 and then transferred to decoder 80 via counter 81 for interpretation. In decoder 80 the field will be examined and a data bit will be sent out when the value of the count attains a number corresponding, for example, to the number of the selection made by the better on the betting slip. That is, if that TIRM is to print the numeral "4" on the betting ticket 140 (FIGURE 14) in division 111 thereof, a "one" pulse will be transmitted to that TIRM after three previous "zeros." Also, the count in the word in register 75 will be updated by one for each pulse received from that TIRM. This count will be placed back into the data register after each pulse is received, in response to a signal from terminal $d$.

Each subsequent timing pulse from the TIRM causes the repetition of the procedure whereby counter 81 will be filled with a count from the data register 75 by way of input gates 82. It will then be similarly examined in the interpreter for the presence of a "one" in each field indicating a data bit to be sent back via the intermediate stages of the system as routed by the force address signals corresponding to the particular LTU (TIRM) involved. The count is also returned from the decoder to terminal c of general control 83 so that when the maximum number of sprocket pulses have been generated by the TIRM, general control 83 will produce a "main frame interrupt" signal at terminal i indicating that the TIRM has finished sending the sprocket pulses. The readings of the counters in the LGS and in the LTUS corresponding to that particular TIRM are then taken into the GPC 25 in order that further processing may take place. When the main frame interrupt signal is received the GPC will generate another "main frame request" signal prior to the transmission of the next bit back to the LTU (TIRM). This signal will be sent from terminal t to terminal h.

It is seen that a shifter 76 is employed in the register assembly 79 having one input from the data register 75. A control shift signal is applied to another input from terminal j of the interpreter 77. This simplifies the circuitry somewhat and enables the least significant part of the word in the register to be shifted then transmitted to the memory. This least significant information portion of the data word may be moved over by, for example, four bits so that new information can be substituted in its place in the register 75. The shifter 76 can be made to shift any desired number of places depending upon the number of bits in the data word that have been used up. However, the shifter does not shift the transmit-receive bit, the pre-message bits or the count bits.

By the use of the shifter and the bit-by-bit handling of the reception and transmission of information to and from the GPC, as well as the process whereby a word is extracted from the memory and replaced after each bit, a single LGS can be used to receive and transmit information from and to several hundred TIRM's. This avoids the necessity for an interpreter for each TIRM and consequently keeps the overall cost of the system much lower. Also, by having each TIRM itself set its own pace for receiving or sending signals there is no necessity for each TIRM being identical with all others in scanning or other operating characteristics and its construction can be considerably less expensive. This feature also obviates synchronized control of all TIRM's from a control master clock.

DETAILED EXPLANATION—LGS GATES 69 AND DECODER 70

FIGURE 8 shows a schematic diagram of the gates 69 and the decoder 70 shown in block form in FIGURE 6. The gates 69 include a terminal 92 to which a switching signal from terminal s of the GPC is applied. The signal at terminal 92 is inverted in inverter 91 before application as inhibit inputs of the AND gates 89 whereas it proceeds uninverted to AND gates 88.

When it is desired that the gates 88 transmit address bits from the GPC 25 for use in a "force address" operation the signal is applied to terminal 92 from terminal s which simultaneously closes gates 89. It will be recalled that the force address operation occurs when the GPC wishes to transmit information to a particular TIRM. In such a case, four address bits are applied by the gates 88 to the OR gates 87. Each output represents a different binary digital place, i.e. $2^0$, $2^1$, $2^2$ and $2^3$. The output of gates 87 is split into a "zero" representative signal line after passage through logical inverting stage 86 and into a "one" representative signal line in a parallel path. This is done to enable each of the four outputs of gates 87 to apply either a "one" or "zero" as desired to the four input terminals of each AND gate 85 in the decoder 70.

The decoder 70 includes sixteen AND gates 85, one for each of the various LTUS' serviced by that LGS. Each gate 85 has four inputs, the top input being the $2^3$ input, the next lower being $2^2$, the next lower being $2^1$ and the lowest being $2^0$ as exemplified by the gate 85 located in the top left corner of rectangle 70. That gate shows "zeros" in all of its input places. Thus, by the application of the various permutations of zeros and ones in the outputs of gates 86 any particular gate 85 may be selected and consequently any particular LTUS may be selected when the GPC desires to communicate with a particular LTU (TIRM).

In addition, the decoder 70 is also used during the "receive" operation to generate a signal which scans the outputs of the various LTUS'. This is accomplished in the absence of a signal at terminal 92 for terminal s which allows signals from the counter 72 to pass through gates 89. This will occur during the scanning of the LTU's by the LTUS and the scanning of LTUS' by the LGS for detecting an active LTU, i.e., one in whose output either a "one" or a "zero" is present when its associated TIRM is reading a betting slip or when the TIRM is generating sprocket pulses to elicit data bits from the GPC during a transmit operation. Since no signal is applied at terminal 92 to the gates 88 they cannot pass any signals to the decoder 70.

DETAILED EXPLANATION—DATA CONTROL 74

FIGURE 9 is a logical diagram that illustrates the functioning of the data control 74. A number of inputs, namely sixteen if there are sixteen LTUS', are applied to an OR gate 103. These inputs to gate 103 are from the gates 65 of the data control 54 in each LTUS which is to be serviced. Therefore, whenever there is any data pulse present from one of the associated LTUS' there will be an output bit applied to the interpreter 77 as shown.

DETAILED EXPLANATION—SPROCKET CONTROL 73

FIGURE 10 is a logical diagram indicating one possible arrangement for the sprocket control 73. There are a number of connections from each of the sprocket controls 53 of the various LTUS' to inputs of an OR gate 99 whose output is coupled by a logical inverter 100 to an inhibit input of an inhibit AND gate 101. Thus, whenever a sprocket pulse arrives from one of the outputs of controls 53, the gate 101 will be inhibited and hence the other input thereto from the clock source (not shown) will be ineffective to apply a stepping signal to the counter 72. This means that when there is a sprocket pulse detected by the LGS the counter 72 will stop counting.

Control 73 also includes means for applying a signal from the terminal s of the GPC to another inhibit of AND gate 10 which stops the counter 72 during a transmit operation from the GPC.

The sprocket pulse output of OR gate 99 is also applied to interpreter 77 at terminal a of generator control 83.

TIRM—GENERAL CONSTRUCTION AND OPERATION

FIGURE 13 shows the top panel of a TIRM that can be used in the overall system explained thus far. The TIRM includes "cash" and "sell" indicator buttons 127 which set the TIRM to the appropriate mode. When the "sell" button is pressed, the TIRM will accept betting slips, display the amount to be collected and will issue but not receive tickets. It includes a betting slip insert slot 121 into which a marked betting slip 110 may be deposited so that the magnetic or other markings thereupon may be read and the data transmitted to the GPC 5. It also includes a cutout or window 197 permitting viewing of a betting slip after its magnetic markings have been read and before it is stored or possibly rejected. Should there be some impropriety in the betting slip it will be rejected and pass out through reject slot 206. If there is an error in transmission between the TIRM and the GPC or if there is a malfunction of the TIRM there will be a reject and indicator 296 will light up. After the magnetic markings have been sensed and the data is sent to the GPC 5 in the manner previously described, the GPC calculates the total amount to be collected and sends a message back to that TIRM by the intermediate stages in the manner previously explained. This message in the TIRM is routed in response to the pre-message bits therein to an indicator display such as is shown in windows 122 and 123. (These same windows may also be used for indicating the amount to be paid to the bettor if he holds a winning ticket when the TIRM is used for cashing.) Also, when the betting slip has been read, the GPC 25 will compose a message and transmit it back to that TIRM. If the betting slip is improperly marked the TIRM will be signalled to reject it via slot 26. If the betting slip is properly made out, the GPC message will be routed to a ticket-printing mechanism in the TIRM as will be explained below. The printing mechanism is set in the TIRM and is actuated, the betting data is recorded magnetically in the stripe 146 and a ticket such as the ticket 140 emerges from the issuing slot 124. The ticket is issued after the teller has depressed the release key 125. If that bettor has more than one betting slip, the teller will depress the ADD button 129 for each slip except the last when he will press the RELEASE button 125 and the total amount to be collected is displayed in windows 122 and 123.

After the race, the possessor of a winning ticket may come to the same or a different station and the cashier will depress the "cash" button 127 whereupon the TIRM will accept tickets and display the pay-off amount but will not accept betting slips. The bettor will insert his ticket in the winning ticket insert slot 126 and it will be transported up into view in the right half of the ticket comparison window 254 which includes a magnifying glass. The information on the back of the ticket is read by an appropriate magnetic transducer such as the magnetic head 292 (FIGURE 19), and sent to the GPC. The GPC then, if the ticket is a winning one, sends a message back to the TIRM to set various type bars therein into position such that characters corresponding to the type bar indicia appear under the framing mask 256. Thus, an instantaneous visual comparison can be made of the indicia on the front of the ticket with the data derived from the magnetic recording in stripe 146 on its back. The GPC also has computed the amount to be paid to the bettor and this is also set up and displayed in windows 122 and 123. If the visual comparison reveals that the ticket is a valid one, the cashier will press the release button 125. If the bettor has more than one ticket, the cashier will press the "add" button 129 after each ticket is processed and the payout amount will be indicated for each ticket. After the last ticket of that patron, the cashier presses the "release" button and the total amount to be paid will appear in windows 122, 123 after all tickets from that bettor have been presented and compared.

He will then pay the bettor the amount indicated in the pay display. Pressing down the release button automatically forwards the ticket for cancellation and storage.

If the side-by-side visual comparison reveals that the ticket is not a winning ticket or is otherwise defective, the teller can press the reject button 128 whereon the rejected ticket will issue from the rejected ticket slot 282.

The TIRM has four main sections. They are the betting slip processing path, the ticket issuing path, the ticket comparison and printing subassembly, and the ticket cashing cancellation path.

TIRM—BETTING SLIP PATH

FIGURE 16 is a side elevation view, partly in section of the main elements of this path. The TIRM has a housing 179 which includes a betting slip insert slot 121 into which the betting slip 110 is inserted. Under certain circumstances (i.e., after a race has begun in certain installations or when the TIRM has been switched to the cashing or payoff mode) it may be desired to block this slot and therefore a solenoid-operated barrier is placed near the slot 121. This barrier consists of a pivoted lever 192 which pivots about pivot point 191. Its lower corner is connected to the armature of a solenoid 189 which is actuated in conventional ways by switching current through it. This will cause the lever 192 to move counter-clockwise whereby its right hand end will obstruct the slot 121.

Not shown in this figure but present to guide the betting slip 110 in its travel through the betting slip path is channel 253 (FIGURE 18) which prevents, for example, lateral movement of the slip 110 as it goes through the various rollers involved. The actual trajectory of the betting slip is indicated by the broken line 196 and it is along this line that the channel extends to guide the slip. The betting slip enters between rollers 186 and 185, the latter being driven by a belt or other appropriate mechanism fitted around a driving cylinder 190. It continues between roller 185 and 187, then between rollers 180 and rollers 188, between rollers 188 and 184, past the magnetic transducer or reading head 193, over roller 195 and then below window 197 in which the betting slip may be visually observed from about the TIRM.

It will remain under the window 197 so long as the display lever-roller 199' does not engage it. This disengagement is accomplished by actuation of the solenoid 198. When the lever-roller 199 pivots so that its roller does engage the bottom surface of the betting slip, the slip will be propelled toward the right by roller 199'' and out of sight of the window 197. If, after inspection of the betting slip there appears to be an irregularity, the teller can, by pressing the reject button 128, actuate solenoid 204 which causes a reject lever 205 to pivot counter-clockwise. Thus the betting slip will be propelled up the incline of member 205 and out through the reject slot 206. If inspection of the betting slip reveals that all is in order, the member 205 is maintained in its position as shown in FIGURE 16 whereupon the betting slip is propelled to the right under it and thence between the rollers 207, 211 and 207, 212. These direct the betting slip downward past a counter mechanism indicated schematically at 208. Next, it passes between the roller 209 and rollers 213–14 into the stacker indicated generally at the numeral 210. The stacker may be any conventional type such as one having a horizontal rigid member 215 supported by springs 216 and 217, for example. If desired, the stacker may be dispensed with entirely and the betting slips can be fed to a discard or destruction device (not shown).

Situated just below the lever-roller 199 and the reject assembly and located substantially transverse to the trajectory 196 are four type bars 200, 201, 202 and 203. These type bars are moved toward and away from the reader hereof by flexible members, as will be explained in detail later to positions determined by the information read from the betting slip by the head 193. Such information, for example, might include the number of the selected horse, the pool, the amount being bet, and the number of race where betting on any desired future race is permitted.

TICKET ISSUING PATH

Figure 14:
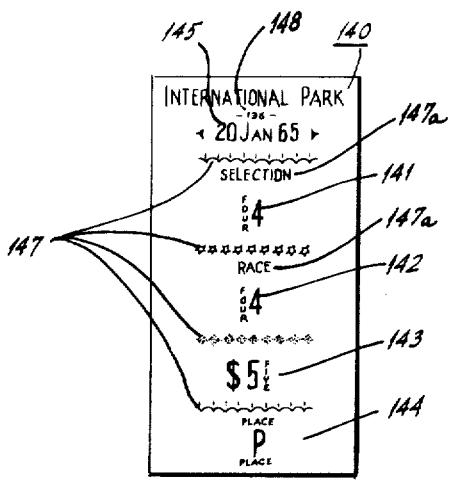
FIGURE 14 shows the front of a betting ticket produced by the betting machine shown in FIGURE 13.
Figure 15:
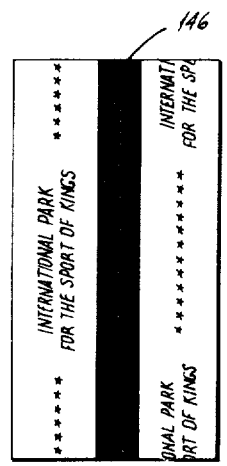
FIGURE 15 is the reverse side of the betting ticket shown in FIGURE 14.
Figure 17:
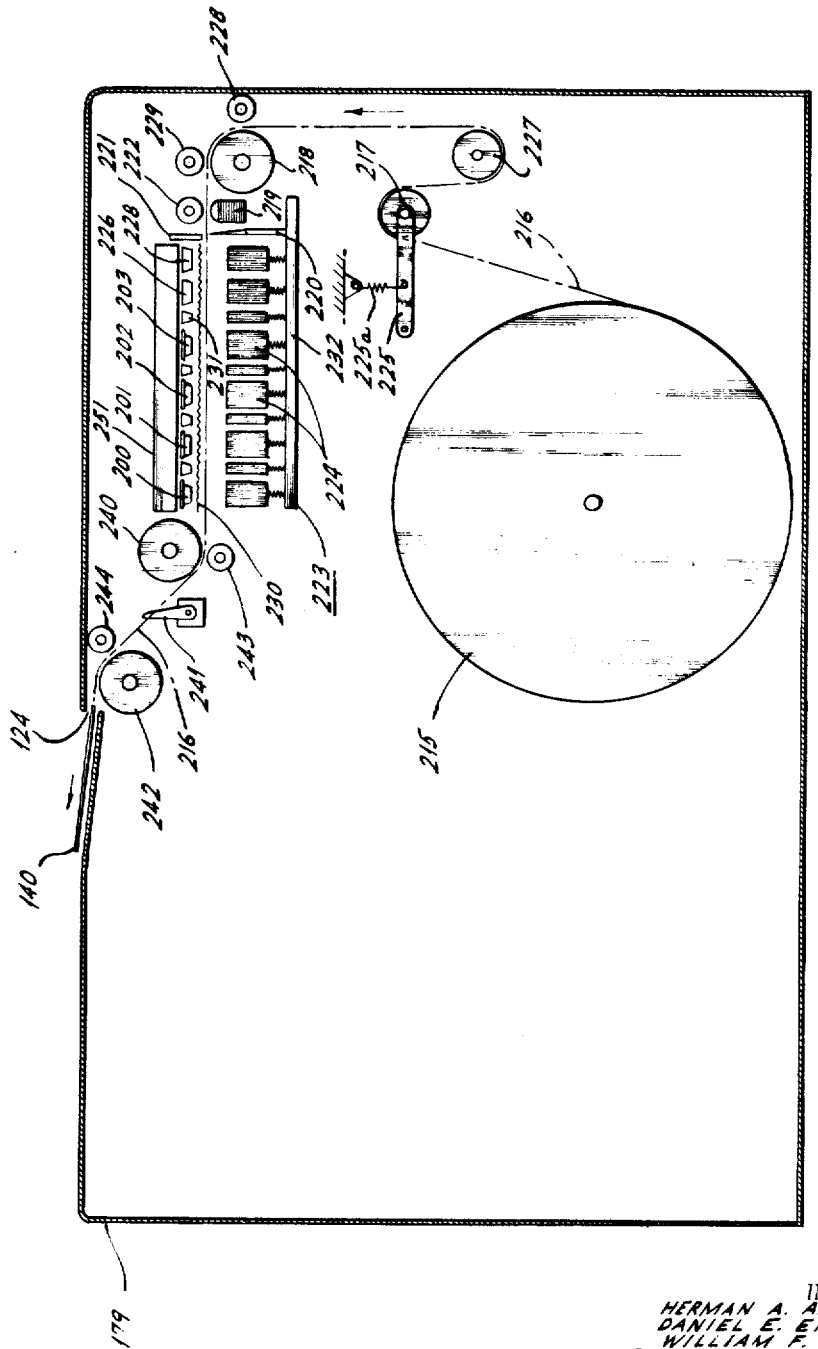
FIGURE 17 is a substantially schematic and partially sectional view of a part of the betting machine taken along the line 17—17 in the direction indicated in FIGURE 13.

FIGURE 17 shows the ticket issuing path. After the betting slip has been read and the information thereon is digested by the GPC 5, the teller depresses the release key 125 (or add key 129 as the case may be) causing the TIRM to print and issue a ticket from slot 124. This ticket, may be as shown in FIGURE 14. The ticket 140 would have the name of the race track printed on it, possibly the number 148 of the TIRM issuing it, the date as shown by the characters 145 and a number of dividing and ornamental type slugs 147. Between any two adjacent ones of the slugs 147 the variable wagering data is imprinted after the teller has received the money indicated in the display windows 122 and 123 as being necessary to place the bet. The GPC will have sent signals to the TIRM, in the manner indicated in the previous discussion of the transmitting operation, which are directed by circuitry in the TIRM to the four type bars. It will cause these type bars to be moved by their flexible drive assemblies into their proper positions relative to the ticket 140. The TIRM will print the data from the type bars when the teller presses the release button 125 or the add button 129 as the case may be.

As shown in FIGURE 14, the ticket 140 has on its front side data concerning the desired horse, the number of the race, the amount of the bet, and the pool. This arrangement and choice of wagering data is presented merely to show that the ticket can have any desired wagering data registered thereupon. On the back of ticket 140 as shown in FIGURE 14 there is a band or stripe 146 of magnetic material on which is recorded magnetic information corresponding to the information printed on the front of the ticket when the betting slip has been read and when the GPC and visual inspection by the teller confirm the propriety of the betting slip.

It will be noted that the information on the ticket does not exactly correspond to the information on the betting slip. The slip has a mark for the number of times the bettor wishes to place this same bet, whereas the ticket does not. The information in division 114 is sent to the GPC wherein it is used to compute the total amount to be collected from the bettor and to compose a message to the TIRM for setting up the pay window displays 122, 123.

Slip 110 has no place to mark the number of the race yet the ticket 140 has the number of the race on which the bet is made. At those tracks where only betting on the next race is allowed, there will be a movable type-bar in the TIRM which is set up to indicate the number of the next race in response to an appropriate signal from the GPC. In other cases where betting on any future race is allowed, the (race number) type-bar in the TIRM is actuated in response to the signal generated by the TIRM when the appropriate marking thereon is read. In either case race information would also be recorded on the magnetic stripe on its reverse side.

When the teller presses the release button after having visually checked out the betting slip and received the money, the ticket 140 is issued from the issue slot 124. The blank strip from roll 215 follows the trajectory indicated by the broken line 216. Guide channel 250 (FIGURE 18) is disposed along the length of the trajectory 216 to guide the strip and prevent lateral movement thereof. The strip proceeds over the driving roller 217, down below roller 227, up between rollers 218 and 228, and then between 218 and 229. Roller 218 is driven by an electrically-controlled intermittent feeding device, for example a conventional single-revolution clutch. It provides continuous paper-feed movement for a specific distance and at an accurately controlled velocity. An idler arm 225 loaded lightly by spring 225a carries idler 217. Sudden tape movements caused by roller 218 are absorbed by movement of 217 downward which is followed by rotation of supply roll 215 to supply more tape. Roller 218 drives the strip between magnetic transducer 219 and idler 222. The magnetic transducer 219 is energized according to conventional techniques with signals that will magnetically record data on the magnetic stripe 146 on the back of the ticket 140. This data corresponds to but is not limited to the data which will be printed on the front side of ticket 140 as shown in FIGURE 14. The ticket strip is then moved into position below an inked ribbon 230 (see also FIGURE 18) which is below the movable type-bars 200–203. There may also be fixed but adjustable bars 226 and 228 for changing the data, inserting the number of the TIRM, and for inserting the name of the racing establishment or any other desired information. Between adjacent ones of the movable bars 200–203 are located removable type slugs 231 which produce the dividing lines 147 and/or designations 147a.

Below the strip of tickets there is a print-and-cutter assembly indicated generally at the numeral 223. It includes a movable rigid member 232 on which are mounted a plurality of print hammers 224 that may, for example, be spring-coupled to the member 232. These print hammers move upward below the ticket to press it against the movable and fixed type bars opposite them. The assembly 223 also includes a knife edge 220 which engages the member 221 in a shearing action which cuts the ticket. The cutting occurs just before the anvil member presses the ticket upward against the ribbon 230 and against the fixed and movable type bars 200–203 and 231. The rigid member 232 is actuated in any conventional way such as by electromagnetic or mechanical forces.

After the ticket has thus been printed it is driven by roller 240 and pinch roller 243, past counter 241, between rollers 242 and 244, and then out slot 124 to the bettor.

PRINT-TYPE BAR ASSEMBLY

Figure 18:
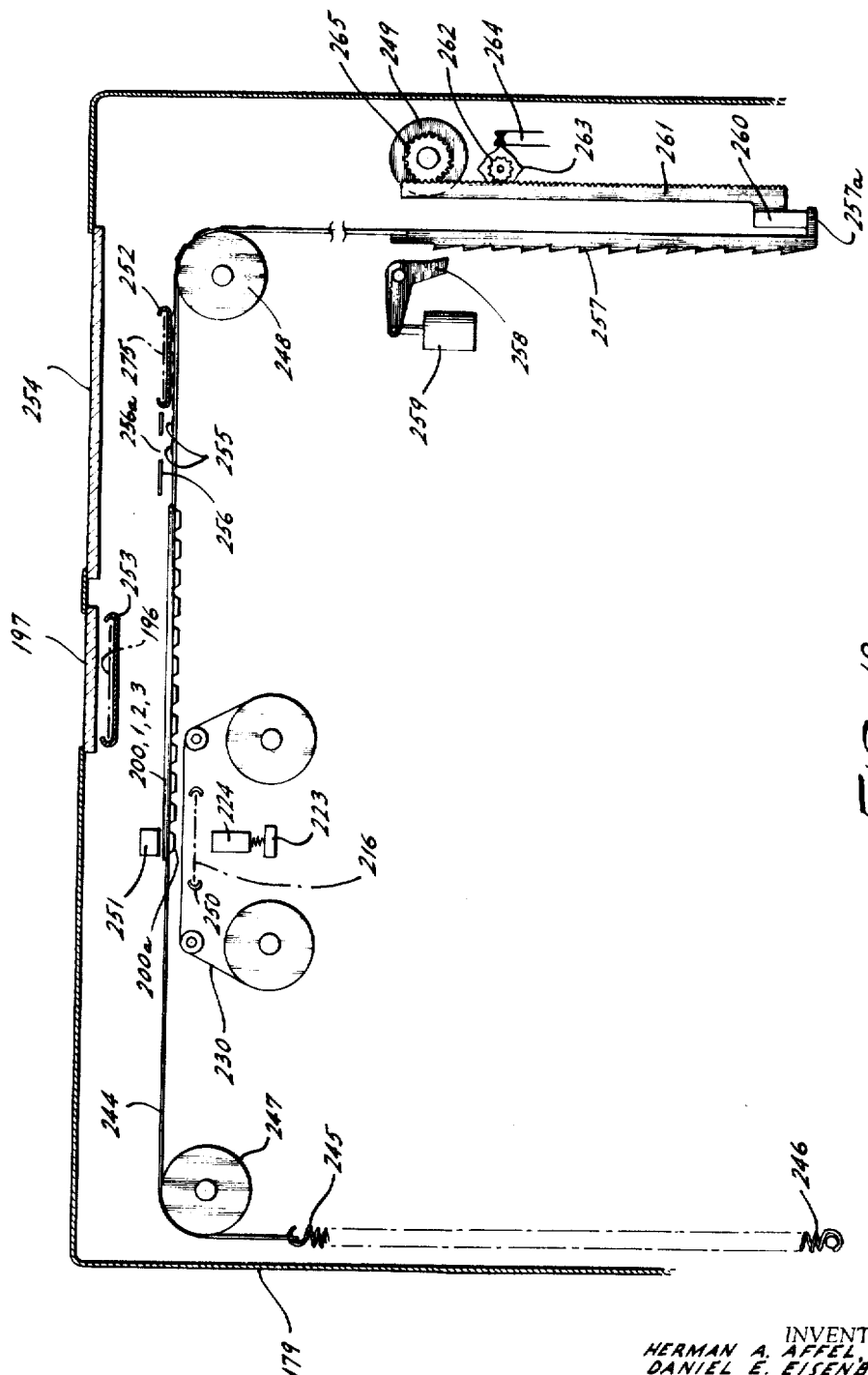
FIGURE 18 is a partly sectional and schematic view of another part of the betting machine shown in FIGURE 13 taken along the line 18—18 in the direction indicated.

FIGURE 18 shows the print type bars 200 and the associated assembly. In accordance with the present invention, a flexible drive assembly is used to position each of the rigid type bars 200–03. As shown in FIGURE 18, this assembly includes a flexible transport member 244 which may be made of metal, for example, having one end connected to a resilient member such as spring 245. The other end of the spring 245 is connected to a fixed member such as the pin 246 that is mounted to an appropriate fixed point within the TIRM. There is, of course, for each type bar, a separate flexible transport member 244 and spring 245. The flexible member 244 is mounted to revolve around the roller 247. Opposite ends of each of the type bars 200–03 are connected between different segments of the flexible member 244.

The flexible tape 244 also is connected to the upper end of a toothed rack 257 whose lower end 257a is formed at right angles thereto. The flexible member 244 passes over another roller 248. It will be seen that the type bars 200–03 are maintained tautly between the sections of flexible member 244 by virtue of the spring tension exerted by spring 245 pulling the bar and the toothed rack 257 which is restrained against upward movement by a bale 260.

Fixed to the upper surface of the member 244 between the right end of each type bar and the upper end of the rack 257 are indicia 255. Each discrete portion of these indicia corresponds to and is substantially identical to each discrete portion of the type bar connected to that particular flexible member 244. The indicia 255 are so arranged that, for example, when the left-most discrete portion is below the opening 256a in the mask 256 (see FIGURE 13), the corresponding left-most portion 200a of the type bar 200 will be in printing position below the anvil 251.

These indicia are employed on two occasions. The first is when the betting slip has been read by the TIRM and found to be in proper form and the GPC has instructed the TIRM to print a betting ticket. The second is when the race is over and the winning ticket is inserted into the TIRM for verification prior to cashing. This latter use will be first be considered. When the information which has been magnetically recorded in the magnetic stripe 146 or the betting ticket has been read by the transducer 292 prior to payoff on a winning ticket, the circuits associated with the transducer 292 will send this information to the GPC. Simultaneously, type bars and amount display are being reset from previous settings. The latter will, in turn, if the magnetic information matches winning data in the GPC send to that TIRM signals which drive the pinion 265 through clutch 249 thereby moving rack 261 and bale 260 upward to set each of the type bars in its proper position as will be explained below. Thus, the sets of indicia 255 will be moved accordingly so that one discrete segment of each will appear under the opening 256a in mask 256. Consequently, in window 254 of the TIRM (FIGURE 13), the front of the winning ticket in guide channel 252 may be seen in parallel with the various indicia 255 portions which appear below the mask 256. These indicia portions should correspond exactly to the data printed on the front of the ticket in order to be valid. Upon visual comparison by the teller and his noting the proper correspondence between the two sets of displayed data, the teller is assured that the ticket is a genuine winning one and he can thus pay the amount indicated in the displays 122, 123.

When the transducer 292 reads the magnetic stripe and transmits the information to the GPC 5, the latter will send back signals which will advance each type bar toward the left by a predetermined amount. This amount will depend upon the recorded information. The advancement of the type bar is accomplished by the following action. A signal from the GPC starts the print clutch 249 which causes pinion 265 to rotate clock-wise. This rotation raises rack 261 and bale 260 and allows racks 257 to follow under the action of springs 245 until one of the solenoids 259 is actuated and member 258 engages a predetermined one of the teeth of the rack 257. Gear rack 261 rotates gear 262 which, in turn, rotates cam 263 opening and closing contacts 264. Contacts 264 generate 12 pulses during the upward travel of the bale 260. Each of these pulses tells the LTU (or GPC) when to send back four bits of information for stopping the type bars at respective predetermined positions.

In the position shown in FIGURE 18, the cam 263 allows the set of contacts 264 to be closed whereupon a sprocket pulse is produced which, via electronic stages described earlier, is sent by the TIRM back to the LGS. This sprocket pulse indicates that the TIRM is ready to receive the next (4) bits of information.

For example, if the magnetic head 292 has read the stripe 146 on the back of the betting ticket the TIRM will operate to move type bar 203 to a position wherein the numeral "4" appears below the openings 256a in the mask 256 which shows the number of the horse selected. The rack 257 follows bale 260 upward until the fourth from the left of the indicia 255 associated with that type bar is approaching the appropriate opening 256a in the mask. Then the solenoid 259 is actuated preventing further upward movement of that one of the racks 257.

Of course, the other three type bars 200, 201, 202 and their associated flexible tape assemblies will similarly be moved to the left and set up similarly by their associated pawls 258. Thus, for example, the rack corresponding to type bar 201 assembly (the amount of the bet for example) will be stopped by its corresponding one of the pawls 258 when its associated indicia 255 will reveal a "$5" character through mask 256.

Since all of the four racks 257 move up in unison with the lifting of the bale 260, the TIRM includes means for converting the serially-transmitted data from the GPC to parallel input data for the four solenoid-pawl subassemblies 258, 259. This is accomplished by circuits in the TIRM which distribute the incoming message bits to different parts of a register in response to the pre-message bits in the word. As the bale 260 moves upward, the contents of the register are scanned for the presence of a "one." If a "one" is detected, the solenoid-pawl subassembly 258, 259 associated with that part of the register is actuated thereby preventing further upward movement of the associated one of the racks 257. After all of the type bars have been set, the teller makes a visual comparison in the magnifying window 254 before paying the amount indicated in the windows 122, 123.

It should be noted that the procedure in the cashing operation for the movement of type-bar assemblies 200–263 is substantially the same as when they are originally set up to print the ticket 120. In the latter case, however, the TIRM is instructed by signals sent from the GPC in response to the reading of the betting slip by the transducer 193 (FIGURE 16).

TICKET RECEIVING AND PAYOFF PATH

Figure 19:
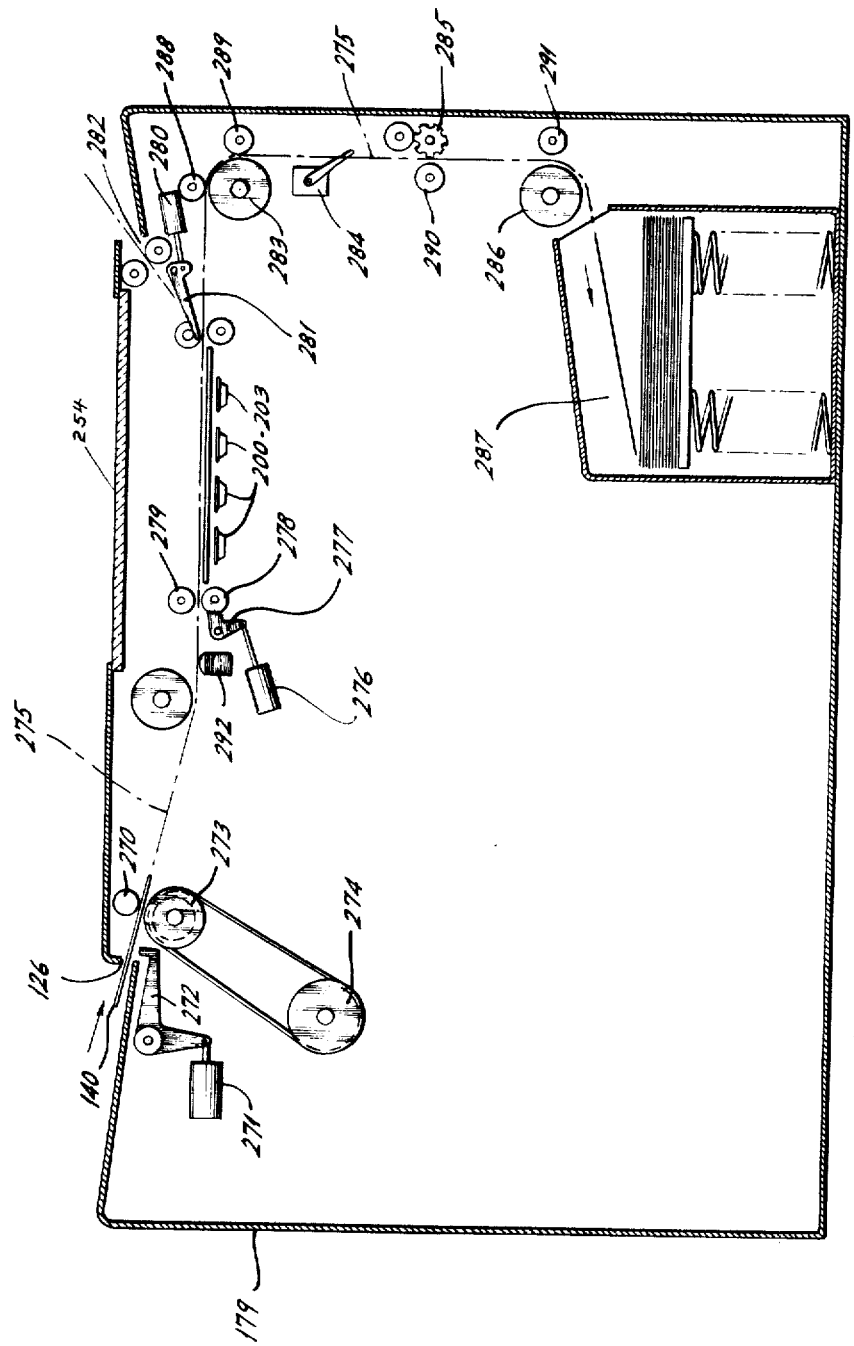
FIGURE 19 is a partly sectional and schematic view of another part of the betting machine shown in FIGURE 13 taken along line 19—19 in FIGURE 13.

FIGURE 19 shows a ticket 140 being inserted into the winning ticket insert slot 126. It can only be inserted after the particular race has been run; otherwise the pivoted barrier member 272 will block the slot 126 in response to appropriate signals applied to solenoid 271 from the GPC or other central control station. When the ticket 140 is allowed to enter, it is moved between rollers 270 and 273, the latter being driven by a belt attached to a drive-cylinder 274. The path of the ticket is indicated by the broken line 275. This path is maintained by appropriate guide channels such as the guide channel 252 shown in FIGURE 18. The ticket 140 is drawn past magnetic transducer 292 which reads the information magnetically recorded in the stripe 276 and generates signals which are sent back to the TIRM to cause the type-bars 200–03 and their associated sets of indicia 255 to be moved into their respective proper positions under the openings in the mask 256. If, after visual comparison by the teller, he is satisfied that the ticket is a valid one, and if the GPC confirms or validates the ticket, the solenoid 276 will be energized to pivot the idler roller 278 attached to pivot member 277 in a counter-clockwise position. Thereby, the ticket 140 will be pressed against drive roller 279 to advance it over the bars 200–03, below the reject member 281, and thence along the rest of the prescribed path 275 into the stacker 287. However, if the data read from the stripe 146 does not match winning data contained in the GPC the solenoid 280 will be energized by a signal from the GPC. Similarly, if the visual comparison does not satisfy the teller, he will press the reject button 128 which causes the solenoid 280 to be energized. In either case, the reject member 281 is pivoted counter-clockwise and the ticket is propelled upward and outward through the ticket reject slot 282.

If the ticket has been validated, it will pass between the drive roller 283 and idlers 288 and 289 which move it downward past counter 284. After passing the counter 284 it passes between idler 290 and a cancelling (if desired) rotary member 285. It then passes between driven roller 286 and idler 291 into the stacker 287 which may be of the same general type as the one shown in FIGURE 16.

Not previously discussed is the mechanism for actuating the figures in the pay and collect display windows 122, 123. It will be recalled that the numerals therein are set up in response to reading of the betting slip and reading of the magnetic stripe on a winning betting ticket. The amounts displayed therein are computed in response to the information fed to the computer from the slip and ticket respectively. It is possible to provide for this display an arrangement similar to the arrangement for moving the type-bars 200–03 and their associated sets of indicia 255. It is also possible to provide other, conventional types of display mechanisms for this purpose.

ALTERNATIVES DISCUSSED

While the present system has been explained in terms of one in which the betting machines are usually dual-purpose, it should be understood that they need not be. In some cases there may be a number of ticket issuing machines made solely for that single purpose. This machine would be essentially the same as a TIRM except that it would not have a ticket receive slot, a ticket comparison window, a ticket reject slot, a cash-sell indicator, a ticket input counter, or a ticket stacker. It also would not have any of the mechanical, electrical or electro-mechanical components of the TIRM that are used just for the ticket cashing operation.

TIRM—ELECTRONIC CIRCUITRY

The TIRM'S (or TIMS as the case may be) also include electronic circuits and components for effecting the various operations previously described especially in connection with FIGURES 13–19. These circuits may be straightforward circuits of conventional construction. These circuits are briefly explained below.

The TIRM has an input/output circuit controlled by the master TIRM control for receiving and sending signals to its associated LTU. It includes circuits for amplifying signals on the TIRM's input line and sends them to another circuit which produces appropriate output pulses representing the start or stopping of messages and other pulses during the message. It takes the input signals and forms data pulses for the given TIRM operation. It also checks the data transmission and signals error if appropriate.

The TIRM input/output circuit also takes signals produced therein, amplifies them and sends them to the LTU. Such output signals would be timing and data signals which have been combined to form the zero and one pulses having respectively different widths. It also takes the input and checks for proper return from the LTU and produces an error signal if not.

The TIRM also includes a message decoder which receives timing and data bits from the input/output circuit. From these inputs it derives message type information, e.g., whether the message relates to betting or pay-off, whether it is sprocket or data information, etc., and sends message type information to the master TIRM control. It also determines whether the TIRM is in a transmit or receive mode and signals the master TIRM control and its input/output circuit accordingly. In addition, it receives signals from the various buttons on the panel of the TIRM. It also receives cash account data from a special switch inside the TIRM which is actuated when the TIRM is unlocked and the stacked betting slips and tickets are removed and the counters are read. This cash account data is sent to the GPC. It produces output-timing signals and sprocket and data signals for application to the input/output circuit.

The TIRM control receives message type data from the message decoder in the TIRM which tells it whether it is a betting slip message, ticket data, a reject signal, etc. It also receives timing signals from many sources which give the time in a given cycle that each event takes place. It receives information from the decoder indicating whether it is operating in the receive or transmit mode. It receives information from the cash/sell button indicating whether the TIRM is in a cash or sell status. It receives signals from other buttons indicating which button has been pressed. Finally, it receives error signals from many points in the system indicating a malfunction. The master TIRM control accepts these input signals and provides start, reject, stacking, printing, cancelling, reset, and indicator control signals for the control circuits which drive the corresponding mechanisms in the betting slip path, in the ticket issue path, in the ticket receive path, in the printer and type-bar subassembly and in the various indicators such as the pay and collect indicators, the reject indicator and the repeat indicator. In addition, the TIRM control transfers the sprocket and data pulses to or from the input/output circuit. The master TIRM control circuit also sends control signals to operate the input/output circuit.

The TIRM also includes circuits for operating the components along the betting slip path. For example, it will include a control circuit responsive to the start, reject, stack, and reset signals from the master TIRM control for controlling the admission of the betting slip, its transport in the path, the stop and start of the display in the pay and collect window, the ejector mechanism, the stacker mechanism, and the counter. It will also include amplifiers for amplifying the timing signals produced as the betting slip is read and the signals derived from the bettor's marking of the various divisions on the slip. It also has a circuit for driving the counter.

The TIRM will also include electronic circuits in the ticket issuing path actuated by the start, print, and reset signals from the master TIRM control which govern the transport motor, the printing anvils and cutting mechanism, and the ticket issue transport mechanism. These circuits will, additionally, amplify the incoming sprocket and data signals for application to the transducer which impresses the magnetic synchronizing and data information in the magnetic stripe 146. A driver for the counter in this path is also under the control of the ticket issue path control circuit.

For operating the various components of the printer and type-bars in the TIRM there is a circuit for controlling the printing clutch. This receives starting and reset signals from the TIRM master control. Provision is also made for amplifying signals produced by movements of the type-bar for use as sprocket signal outputs. An amplifier for the data bits transmitted to the TIRM is also provided for operating the various type-bar solenoids to limit the positions of their associated racks.

The ticket receiving path of the TIRM includes a control circuit which receives start, reject, stack, cancel and reset signals from the master TIRM control. In response to these input signals it controls the entry, the transport of the ticket in its trajectory, the start and stop of the display, the ejector mechanism, and the canceller. It includes amplifiers associated with the magnetic transducer for amplifying the synchronizing and data signals produced in reading the data recorded on the magnetic stripe. The control circuit also produces a counting signal which is fed to an amplifier to control the counter in this path.

The various control circuits for the components in the various paths and subassemblies all produce error and timing signals which are sent to the master TIRM control circuit for indicating equipment malfunctions and the time in a given cycle that each event takes place.

The TIRM also includes circuits for setting up the various amounts in the pay and collect displays 122, 123. These include a control circuit which receives starting and reset signals from the master TIRM control for controlling the clutch. The former control circuit generates timing and error signals which are sent to the TIRM master control. The circuitry also includes an amplifier for amplifying synchronizing signals from the display for use as sprocket outputs. It also includes a solenoid amplifier for taking data bits from the GPC and stopping the appropriate row of digits at the number corresponding to the number of received data bits.

The TIRM also includes appropriate circuits for generating signals in response to the depression of the various operating buttons and for illuminating the various indicators. It includes a circuit for sending a signal to the master TIRM control when it is switched from one mode to the other. Similarly, it includes circuits for applying signals to the message decoder in response to actuation of the add, release, reject, and cash account buttons.

The invention has been described in terms of a system which employs a betting slip preparatory to issuance of a betting ticket. However, the electronics of the present system including the bit-by-bit conveyance of information from the TIRM to the GPC and vice-versa is adaptable to a more conventional type of input, i.e., a keyboard type of betting signal generator.

It is also alternatively possible to provide each bettor with a small plastic device having a number of perforations arranged in line similar to the row of parentheses shown on the betting slip and having opposite each perforation a transversely-slidable button movable into either of two possible positions. In one position it would signify a selection; in the other the contrary would be indicated. Thus, when the button had been moved into the "select"

position it would correspond to a pencil mark in one set of parentheses in the betting slip. This device would be inserted into a betting machine which, in response to "reading" of these perforations, would generate appropriate betting signals. This plastic device could be retained by the bettor for re-use and would obviate the need for special pencils. Also, it would enable mistakes to be easily corrected merely by movement of the erroneously positioned button to the proper position. The betting machine would, as in the other forms, produce a machine-readable betting ticket.

It should also be recognized that the system can be practically entirely automated even with respect to the acceptance and payment of money. For example, the ticket issuing station could be equipped with an automatic bill recognizing apparatus so that after the betting slip or equivalent has been inserted and after a dollar amount to be collected has been shown in display windows 122, 123, the patron would place the required bill or bills in the automatic bill recognizer. After the recognizer had scanned the bill and proved its validity, the recognizer would produce a signal which would be applied to the TIRM to actuate the same mechanism as the release button which would thereupon enable the TIRM to print and issue a parimutuel betting ticket. A typical bill recognizer is the AC Bill Changer distributed by Rowe AC Services, a division of Automatic Canteen Company of America. While that apparatus is ordinarily used to convert paper currency to an equivalent amount of coin change, it produces a validation signal internally which could be applied to the TIRM in the manner previously indicated instead of converting the bill to coins. In some instances, instead of a bill receiver, apparatus which accepts larger denomination coins and conventionally gives smaller coin change could be similarly adapted and used. An example of such apparatus would be Model 35E made by the Abbott Coin Counter Co., Inc.

Similarly, on the winning ticket cashing end, the signal in the TIRM which indicates that the winning ticket is valid could be used, together with the signals which set up the amount of the payoff in windows 122, 123, to actuate money dispensing apparatus. For bills, there is a prepackaged "counted currency" machine covered by Patent 2,847,810 which is sold by the Currency Prepackaging Machine Co., Inc., of Detroit, Mich. To dispense coins, the Brandt Model 161 could be used. By employing these devices, it is possible to cut down to the desired extent the number of employees required wtih the present system even further.

Instead of the betting slip accounting machines and the ticket accounting machines shown in the system in FIGURE 1, there may be a so-called "optical journal" which reads and cumulates the information directly from the betting slips and the betting tickets in each TIRM (or TIM) to provide summarization and reconcilation information for the computer at the end of each day, for example.

Alternatively, each of the type-bar assemblies can be connected to or include still another set of printing bars containing corresponding information so that when the betting slip has been read and its data has been set up for visual comparison, actuation of the release button will print not only a betting ticket but also an entry into a printed journal tape. On cashing, there could be similar arrangement within the TIRM which would print the data from the proffered ticket and the amount of payoff onto a separate tape. These paper tapes could be used to reconcile any discrepencies between the cash balances reported by the GPC for each station and the case turned in by the teller.

While the invention has been described in great detail, many variations not specifically mentioned are possible. Consequently, all examples given are intended to be non-limiting and the true extent of the invention is to be determined from the appended claims.

We claim:
1. A ticket issuing and receiving machine comprising:
   (1) means for producing first electrical signals corresponding to indicia incorporated in a first physical medium which is applied to said means, said indicia corresponding to selected wagering data,
   (2) means being responsive to signals including said first electrical signals for producing a second physical record which includes the same wagering data in a normally visible form and also in a normally invisible form,
   (3) means responsive to the application of said record thereto for producing second electrical signals in response to sensing of said invisible data, and
   (4) means responsive to produce, in response to said second signals, visible indicia corresponding to said data in normally invisible form for comparing said visible indicia with said wagering data which is in normally visible form on said second record.

2. In the system according to claim 1 wherein said normally invisible form of said wagering data is a magnetic recording thereof and wherein said magnetic recording is on one side of said record and said visible form wagering data is on the other side thereof.

3. In the system according to claim 2 wherein said indicia incorporated in a physical medium is a betting slip having a plurality of designated locations for the entry of marks corresponding to said selected wagering data and wherein said physical record comprises a parimutuel betting ticket in which said wagering data in a normally visible form consists of printed wagering data and in which said wagering data in normally invisible form consists of data magnetically recorded thereupon.

4. A system for processing wagering data comprising.
   (a) means for producing electrical signals corresponding to indicia incorporated in a first physical medium applied to said means, said indicia corresponding to selected wagering data,
   (b) means responsive to said signals for producing a second physical record which includes the same wagering data in a visible form and also in a normally invisible form, and
   (c) means responsive to said second physical record for producing visible indications of said normally invisible wagering data for comparing said visible indicia with said wagering data which is in normally visible form on said second record.

5. Data processing apparatus for a parimutuel wagering system comprising:
   (a) a plurality of means each of which generates electrical signals in series, said signals including selected wagering data bits and timing bits,
   (b) a computer having a memory,
   (c) means coupled between said (a) means and said computer for conveying said bits seriatim to said computer, said (c) means including:
      (i) means for retrieving a memory word from said memory in response to each of said bits,
      (ii) means for interpreting the information in said retrieved word and signalling said (b), (c)(i), and (c)(iii) means in response to the content of that word, and
      (iii) means for modifying said word and replacing it in said memory in response to each of said bits.

6. Data processing apparatus for a parimutuel wagering system comprising:
   (a) a plurality of means to which a physical medium which includes wagering data may be applied, each of said plurality producing a first series of electrical signals corresponding to said data, said signals including timing components and wagering data components, said (a) means also including means for producing a physical record containing said data, (b) a plurality of means each of which is coupled to one of said (a) means, said (b) means including means for separating said wagering data components from said timing components, said (b) means having a first channel coupled to said (a) means solely for receiving said electrical signals therefrom and a second channel coupled to said (a) means solely for enabling transfer of signals from said (b) means thereto, (c) a computer, (d) means coupled between said (b) means and said computer for detecting the presence of said electrical signals and extracting from said computer for each signal detected a memory word, said (d) means including means for interpreting said word and modifying it in response to said detected signals, said (c) and (d) means cooperating to produce in response to the receipt of said first series of signals a second series of signals and to transmit said second series of signals in sequence to said (a) means via said second channel whereupon said (a) means produces said physical record in response thereto.

7. Data processing apparatus for a partimutuel wagering system comprising:

(a) a plurality of means for generating a first sequential series of electrical signals corresponding to selected wagering data, (b) a computer having a memory, (c) means for detecting the presence of any one of said signals in any of said (a) means, (d) means responsive to the detection of said signal in said one (a) means for extracting from said memory a word at an address corresponding to the one of said (a) means in which said signal has been detected, (e) means for modifying said extracted word in response to each one of said series of signals, (f) means for replacing said word in said memory after each modification thereof, (g) means cooperating with said computer and being responsive to a predetermined number of said signals for producing second signals, and (h) means to which said second signals are applied for producing in response thereto a physical record which includes said wagering data in a visible form and also includes said data in a normally invisible form.

8. The apparatus according to claim 7 wherein said first series of electrical signals includes timing signals, wherein said (e) means modifies said extracted word in response to said wagering data signals and said timing signals, wherein said second signals are applied to said (h) means instructing the latter to produce said timing signals in a sequential series, each of said timing signals being detected by said (c) means and being applied to said (d) means which thereupon transmits information to said (h) means via said (b) means.

9. Data processing apparatus for a parimutuel wagering system comprising:

(a) a plurality of means to which may be applied a physical medium which includes wagering data, each of said plurality producing a first sequential series of electrical signals corresponding to said data, (b) a computer having a memory, (c) means for detecting the presence at any time of any one of said first series of signals in any one of said (a) means, (d) means responsive to said detection for extracting from said memory a word at an address corresponding to said one of said (a) means in which said signal was detected, (e) means for modifying said extracted word in response to said detected one of said series of signals, (f) means for replacing said word in said memory after each modification thereof, (g) means cooperating with said computer and being responsive to a predetermined number of said first series of signals for producing a second series of signals derived from stored word, and (h) means to which said second series of signals is applied for producing in response thereto a physical record which includes said wagering data in a visible form and also includes said data in a normally invisible form.

10. Data processing apparatus for a parimutuel wagering system comprising:

(a) a plurality of means to which a physical medium which includes wagering data may be applied, each of said means producing a first sequential series of electrical signals corresponding to said data, (b) a computer having a memory, (c) means for detecting the presence of each of said signals in any one of said (a) means and for extracting from said memory in response to each of said signals a word at an address corresponding to said one of said (a) means, (d) means for modifying said word in response to each of said series of signals each time said word is extracted from said memory, (e) means for replacing said word in said memory after each modification thereof, (f) means cooperating with said computer for producing a second series of signals derived from said stored word after the end of said first series of signals, and (g) means to which said second series of signals is applied for producing in response thereto a physical record which includes said wagering data in a visible form and also includes said data in a normally invisible form.

11. Data processing apparatus for a wagering system comprising:

(a) a general purpose computer, (b) a plurality of means for generating a first series of electrical signals representing selected wagering data, (c) a corresponding plurality of means coupled to said plurality of generating means for separating said signals into first and second types of output signals, (d) at least one means for scanning in sequence all of said (c) plurality of means for detecting the presence of said types of output signals, said scanning means producing first address signals identifying which of said (b) means is being contemporaneously scanned thereby, said scanning means also producing output signals in response to the detection of said first and second types of signals in said (c) means, (e) means for scanning the outputs of all of said (d) means in sequence for detecting the presence of said output signals therein, said (b) means producing second address signals identifying which of said (d) means is being contemporaneously scanned, said (e) means including means for extracting a word in the memory of said computer at a given address in response to receipt of said address signals from said (d) and (e) means and modifying said word by each of said output signals detected in said outputs of said (d) means, said (e) means also replacing said word in said memory after each modification thereof, said (e) means also cooperating with said computer to initiate the transmission of information back to said (b) means via said (c), (d) and (e) means.

12. Data processing apparatus for a parimutuel wagering system comprising:

(a) a plurality of means each of which generates in a predetermined sequence electrical signals having selected wagering data components and timing components, (b) a plurality of means each of which is coupled to one of said pluralities of (a) means for separating said wagering data components from said timing components, said (b) means including first means for producing first output signals for application to subsequent stages, said fisrt output signals corresponding respectively to said data components and to said timing components, said (b) means also returning check signals to its associated one of said (a) means whenever said output signals include said data components, said (b) means also include means for routing a signal from subsequent stages through it toward its associated one of said (a) means, (c) a computer having a memory, (d) a plurality of means for applying first scanning signals in a predetermined sequence to all of said first output-signal-producing means to enable the latter to pass first said output signals to said (d) means whenever either of said components are present, said (d) means including means for stopping said application of said first scanning signals, said stopping means being operative whenever said data or timing components are present in said first output-signal-producing means or when a signal is received from said computer indicating that said computer desires to transmit a signal to said (a) means, said (d) means producing a first address signal identifying the particular one of said (b) means in which said data or timing components were present, said (d) means also including second means for producing second output signals corresponding to said data and timing components, said (d) means also including means for routing a signal from subsequent stages to any selected one of said (b) means, and (e) means for applying second scanning signals in a predetermined sequence to all of said second output-signal-producing means to enable the latter to pass said second signals to said (e) means whenever either of them are present, said (e) means including means for stopping the application of said second scanning signals whenever said second output signals are present in said second output-signal-producing means or whenever a signal is received from said computer indicating that said computer desires to transmit a signal to said (a) means, said (d) means producing a second address signal identifying the particular one of said (d) means in which said second output signals were present, said (e) means also including means for passing said first and second address signals to said computer, said (e) means including means for retrieving from the computer memory a word at an address determined by said first and second address signals, said word includnig information correspouding to a message, to the direction in which said message is to proceed and to the routing of said message in the direction indicated, said (e) means also including means for interpreting said information, and thereupon signalling designated other elements of the apparatus recited herein in response thereto, said interpreting means causing said retrieved word to be modified in response to each of said second output signals and then to be replaced in said memory after each modification.

13. A system for processing wagering data comprising:

(a) a plurality of stations each of which includes
   (i) means for producing first electrical signals corresponding to selected wagering data,
   (ii) means for producing and dispensing a physical record which includes said wagering data in a normally visible form and also in a normally invisible form, and
   (iii) means responsive to the application of said physical record thereto for producing second electrical signals in response to said normally invisible form of wagering data, (b) a computer having a memory, and (c) means coupled between each of said stations and said computer for conveying said first and second signals to said computer and also for conveying signals from said computer to predetermined ones of said stations, said computer including means signalling said (a) (ii) means to produce said record in response to and after processing said first signals, said computer also including means signalling said station to take up said record and to pay an indicated amount in response to and after processing said second signals.

14. The system according to claim 13 wherein such of said stations also includes (a) (iv) means for producing visible indicia upon the receipt of signals from said computer generated in response to said second signals, said visible indicia corresponding to said normally invisible form of wagering data and enabling visual comparison with said normally visible form of wagering data.

15. The apparatus according to claim 5 with the addition of (d) a plurality of means for producing and dispensing a physical record in response to a signal from said (c) (ii) means, said physical record including said wagering data in a normally visible form and also in a normally invisible form.

References Cited

UNITED STATES PATENTS

| | | | |
|---|---|---|---|
| 3,029,414 | 4/1962 | Schrimpf | 340—172.5 |
| 3,124,674 | 3/1964 | Edwards et al. | 340—172.5 X |
| 3,211,470 | 10/1965 | Wilson | 235—61.12 X |
| 3,246,126 | 4/1966 | Schlieben et al. | 235—61.11 |
| 3,252,149 | 5/1966 | Weida et al. | 340—172.5 |
| 3,277,445 | 10/1966 | Diamont et al. | 340—172.5 |
| 3,294,956 | 12/1966 | Jenkins et al. | 235—61.9 |
| 3,296,597 | 1/1967 | Scanlin et al. | 340—172.5 |
| 3,308,439 | 3/1967 | Tink et al. | 340—172.5 |
| 3,314,051 | 4/1967 | Willoox et al. | 340—172.5 |
| 3,327,292 | 6/1967 | Eriksson et al. | 340—172.5 |
| 3,083,904 | 4/1963 | Brenner et al. | 235—61.12 |
| 3,146,342 | 8/1964 | Perotto | 235—61.11 |
| 3,253,125 | 5/1966 | Jorgensen et al. | 235—61.9 |
| 3,287,543 | 11/1966 | Halpern | 235—61.12 |

PAUL J. HENON, Primary Examiner

U.S. Cl. X.R.

235—61.9, 61.11, 61.12, 92